(12) United States Patent
Hertz-Shargel et al.

(10) Patent No.: US 11,894,678 B1
(45) Date of Patent: *Feb. 6, 2024

(54) LOAD REDUCTION OPTIMIZATION

(71) Applicant: EnergyHub, Inc., Brooklyn, NY (US)

(72) Inventors: Benjamin Hertz-Shargel, Roslyn Estates, NY (US); Michael DeBenedittis, Brooklyn, NY (US); Seth Frader-Thompson, Brooklyn, NY (US)

(73) Assignee: EnergyHub, Inc., Brooklyn, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/957,140

(22) Filed: Sep. 30, 2022

Related U.S. Application Data

(63) Continuation of application No. 17/011,562, filed on Sep. 3, 2020, now Pat. No. 11,462,907, which is a
(Continued)

(51) Int. Cl.
*H02J 3/00* (2006.01)
*G05B 13/04* (2006.01)
(Continued)

(52) U.S. Cl.
CPC .............. *H02J 3/00* (2013.01); *F24F 11/30* (2018.01); *F24F 11/62* (2018.01); *G05B 13/041* (2013.01);
(Continued)

(58) Field of Classification Search
CPC ........ H02J 3/00; H02J 2003/007; F24F 11/30; F24F 2110/10; F24F 11/62; F24F 11/46; F24F 11/64; F24F 11/58; G05B 13/041
See application file for complete search history.

(56) References Cited

U.S. PATENT DOCUMENTS 6,785,592 B1  8/2004  Smith et al.
7,908,116 B2  3/2011  Steinberg
(Continued)

FOREIGN PATENT DOCUMENTS

WO   WO 2008/003033   1/2008

OTHER PUBLICATIONS

Chen et al., "Demand Response-Enabled Residential Thermostat Controls," ACEEE, 2008, 1-24-1-36.
(Continued)

*Primary Examiner* — Zhipeng Wang
(74) *Attorney, Agent, or Firm* — Fish & Richardson P.C.

(57) ABSTRACT

Methods, systems, and apparatus, including computer programs encoded on a computer storage medium, for performing load reduction optimization. In one aspect, a method includes accessing load reduction parameters for a load reduction event, accessing energy consumption models for multiple systems involved in the load reduction event, and performing, based on the load reduction parameters and the energy consumption models, a plurality of simulations of load reduction events that simulate variations in control parameters used to control the multiple systems. The method also includes optimizing, against a load reduction curve, the load reduction event by iteratively modifying the control parameters used in the plurality of simulations of load reduction events, and outputting the optimal load reduction event with optimized control parameters.

20 Claims, 14 Drawing Sheets

Related U.S. Application Data continuation of application No. 15/785,533, filed on Oct. 17, 2017, now Pat. No. 10,770,897.

(51) Int. Cl.
*F24F 11/30* (2018.01)
*F24F 11/62* (2018.01)
*F24F 11/64* (2018.01)
*F24F 11/58* (2018.01)
*F24F 110/10* (2018.01)
*F24F 11/46* (2018.01)

(52) U.S. Cl.
CPC .............. *F24F 11/46* (2018.01); *F24F 11/58* (2018.01); *F24F 11/64* (2018.01); *F24F 2110/10* (2018.01); *H02J 2203/20* (2020.01)

(56) References Cited

U.S. PATENT DOCUMENTS

| | | | |
|---|---|---|---|
| 8,386,087 B2 | 2/2013 | Spicer | |
| 9,765,984 B2 | 9/2017 | Smith et al. | |
| 9,807,099 B2 | 10/2017 | Matsuoka et al. | |
| 10,152,076 B2 | 12/2018 | Aggarwal et al. | |
| 10,241,528 B1 | 3/2019 | Frader-Thompson et al. | |
| 10,461,540 B2 | 10/2019 | Ghaemi et al. | |
| 10,673,273 B2 | 6/2020 | Ghaemi et al. | |
| 10,746,425 B1 | 8/2020 | Frader-Thompson et al. | |
| 10,770,897 B1 | 9/2020 | Hertz-Shargel et al. | |
| 11,003,146 B2 | 5/2021 | Westervelt et al. | |
| 11,073,849 B1 | 7/2021 | Frader-Thompson et al. | |
| 11,101,664 B2 | 8/2021 | Anisi et al. | |
| 11,462,907 B1 | 10/2022 | Hertz-Shargel et al. | |
| 2005/0047043 A1 | 3/2005 | Schweitzer et al. | |
| 2008/0120068 A1 | 5/2008 | Martin et al. | |
| 2008/0120069 A1 | 5/2008 | Martin et al. | |
| 2010/0114799 A1* | 5/2010 | Black | G06Q 50/06 705/412 |
| 2010/0211224 A1 | 8/2010 | Keeling et al. | |
| 2011/0046806 A1* | 2/2011 | Nagel | H04L 67/125 700/291 |
| 2011/0106328 A1 | 5/2011 | Zhou et al. | |
| 2011/0231320 A1 | 9/2011 | Irving | |
| 2012/0053746 A1 | 3/2012 | Drake et al. | |
| 2012/0084063 A1 | 4/2012 | Drees et al. | |
| 2012/0136496 A1 | 5/2012 | Black | |
| 2012/0232701 A1* | 9/2012 | Carty | G05D 23/1917 700/277 |
| 2012/0323374 A1 | 12/2012 | Dean-Hendricks et al. | |
| 2013/0024141 A1* | 1/2013 | Marwah | G06Q 50/06 702/61 |
| 2013/0090777 A1 | 4/2013 | Lu et al. | |
| 2013/0090791 A1 | 4/2013 | Yeh et al. | |
| 2013/0144451 A1 | 6/2013 | Kumar | |
| 2013/0212410 A1 | 8/2013 | Li et al. | |
| 2013/0231792 A1 | 9/2013 | Ji et al. | |
| 2014/0277761 A1 | 9/2014 | Matsuoka | |
| 2014/0277769 A1* | 9/2014 | Matsuoka | G06Q 50/06 700/278 |
| 2014/0330442 A1* | 11/2014 | Obara | H02J 3/00 700/291 |
| 2014/0339316 A1 | 11/2014 | Barooah et al. | |
| 2015/0220069 A1 | 8/2015 | Linehan et al. | |
| 2015/0248118 A1 | 9/2015 | Li | |
| 2015/0295405 A1 | 10/2015 | Black et al. | |
| 2015/0316282 A1 | 11/2015 | Stone et al. | |
| 2015/0338869 A1* | 11/2015 | Behrangrad | G05F 1/66 700/291 |
| 2016/0077538 A1 | 3/2016 | Berka et al. | |
| 2016/0109147 A1 | 4/2016 | Uno et al. | |
| 2016/0134115 A1* | 5/2016 | Chen | H02J 3/14 700/295 |
| 2016/0234972 A1 | 8/2016 | Billet et al. | |
| 2016/0291561 A1 | 10/2016 | Al-Mohssen et al. | |
| 2016/0292205 A1 | 10/2016 | Massey et al. | |
| 2016/0305678 A1 | 10/2016 | Pavlovski et al. | |
| 2016/0378894 A1 | 12/2016 | Yoon | |
| 2017/0003043 A1 | 1/2017 | Thiebaux et al. | |
| 2017/0167742 A1* | 6/2017 | Radovanovic | F24F 11/70 |
| 2017/0206615 A1 | 7/2017 | Sloop et al. | |
| 2017/0288401 A1 | 10/2017 | Hunnnnon et al. | |
| 2017/0364043 A1 | 12/2017 | Ganti et al. | |
| 2018/0051900 A1 | 2/2018 | Van Goor et al. | |
| 2018/0191197 A1 | 7/2018 | Carr et al. | |
| 2018/0219374 A1 | 8/2018 | Pavlak et al. | |
| 2018/0245809 A1 | 8/2018 | Endel et al. | |
| 2019/0266780 A1 | 8/2019 | Le Floch | |
| 2019/0362529 A1 | 11/2019 | Wedig et al. | |
| 2020/0090045 A1 | 3/2020 | Baker | |
| 2020/0293876 A1 | 9/2020 | Phan et al. | |
| 2021/0241117 A1 | 8/2021 | Wang et al. | |
| 2022/0037916 A1 | 2/2022 | Abbaszadeh et al. | |

OTHER PUBLICATIONS

Honeywell, "Honeywell Wi-Fi Thermostats Allow Homeowners To Connect With Utilities And Turn Up The Savings," Honeywell, Oct. 1-3, 2013.

Notice of Allowance in U.S. Appl. No. 15/366,212, dated Dec. 19, 2018, 7 pages.

Notice of Allowance in U.S. Appl. No. 15/453,127, dated Apr. 8, 2020, 11 pages.

Office Action in U.S. Appl. No. 15/366,212, dated Jun. 13, 2018, 13 pages.

Office Action in U.S. Appl. No. 15/453,127, dated Jun. 19, 2019, 20 pages.

Para, "Nest Thermostats: The Future of Demand Response Programs?," Powermag, Jul. 2014, 6 pages.

Yoav, "What is Demand Response?," Simple Energy, Jun. 1-6, 2015.

Office Action in U.S. Appl. No. 16/363,498, dated Jun. 22, 2020, 11 pages.

Office Action in U.S. Appl. No. 16/363,498, dated Nov. 20, 2020, 15 pages.

PCT International Search Report and Written Opinion in International Appln. No. PCT/US2021/049097, dated Nov. 26, 2021, 13 pages.

* cited by examiner

*1200*

Device Participation Prediction

| Sites | Likelihood | Timing |
|---|---|---|
| 1210 | 1220 | 1230 |
| Site 1 | 5% | 10 minutes before end of thermostat adjustment |
| Site 2 | 10% | 15 after beginning of thermostat adjustment |
| ⋮ | ⋮ | ⋮ |
| Site N | 30% | 30 minutes before beginning of thermostat adjustment |

FIG. 12

LOAD REDUCTION OPTIMIZATION

CROSS-REFERENCE TO RELATED APPLICATIONS

This application is a continuation of U.S. application Ser. No. 17/011,562, filed Sep. 3, 2020, which is a continuation of U.S. application Ser. No. 15/785,533, filed Oct. 17, 2017, now U.S. Pat. No. 10,770,897, issued Sep. 8, 2020, which incorporates by reference U.S. patent application Ser. No. 15/453,127 filed on Mar. 8, 2017, and U.S. patent application Ser. No. 15/366,212 filed on Dec. 1, 2016, which claims the benefit of U.S. Provisional Application No. 62/261,787 filed on Dec. 1, 2015. The complete disclosure of all of the above patent applications is hereby incorporated by reference in its entirety for all purposes.

FIELD

The present specification relates to load reduction.

BACKGROUND

Grid operators may want to manage electrical load, such as electrical power consumption measured in kW, on their grid over a period of time. Specifically, grid operators may want to manage the load on their grid during periods of high energy consumption. In order to manage the load, grid operators can implement thermostat control for customer sites. The thermostat control can be deployed using methods of thermostat cycling and/or temperature offset. The thermostat control may be used to provide predictable demand reduction over multiple hours of control. The predictable demand reduction can reduce supply costs that may be particularly high during periods of peak energy consumption.

SUMMARY

In some aspects, a method of load reduction optimization assigns control parameters to a population of energy consumption devices to achieve an optimal control strategy. The optimal control strategy may correspond to a load reduction event that is optimized against a particular load reduction curve. In other words, the method of load reduction optimization may be used to select a population of monitoring systems, such as energy consumption devices, and generate an optimal control strategy that includes specified control parameters for each of the target systems/devices. Specifically, the method can include accessing energy consumption models and grid operator data for a selected population of systems. Multiple simulations may be performed for each of the systems in the population to iterate through various control parameters of the systems. The control parameters may be optimized over a control space, such as setback events, through the simulations. The various control parameters may be sampled to evaluate potential control strategies, each of which include defined control parameters for each system in the selected population. The control strategy may be optimized against a particular load objective to achieve an optimal load reduction event.

One innovative aspect of the subject matter described in this specification is embodied in methods that include the actions of accessing load reduction parameters for a load reduction event, accessing energy consumption models for multiple systems involved in the load reduction event, and performing, based on the load reduction parameters and the energy consumption models, a plurality of simulations of load reduction events that simulate variations in control parameters used to control the multiple systems. The methods also include optimizing, against a load reduction curve, the load reduction event by iteratively modifying the control parameters used in the plurality of simulations of load reduction events, and outputting the optimal load reduction event with optimized control parameters.

Other implementations of this and other aspects include corresponding systems, apparatus, and computer programs, configured to perform the actions of the methods, encoded on computer storage devices.

Implementations may each optionally include one or more of the following features. For instance, the methods can include the actions of assigning a weighted value to load objective components that are defined by functions of the load reduction curve, optimizing, based on the weighted values of each of the load objective components, the load reduction event.

The method can include assigning a first weighted value to a first load objective component that is derived from linear regression and directed to optimizing a total amount of load reduction achieved in the load reduction event, assigning a second weighted value to a second load objective component that is derived from linear regression and directed to capturing shed drift relative to the load reduction curve, assigning a third weighted value to a third load objective component directed to optimizing an amount of noise around a linear estimate of the load reduction curve achieved in the load reduction event, and wherein optimizing, based on the weighted values of each of the load objective components, the load reduction event comprises optimizing the load reduction event based on the first load objective component weighted according to the first weighted value, the second load objective component weighted according to the second weighted value, and the third load objective component weighted according to the third weighted value.

The method can include performing the plurality of simulations and optimizing the load reduction event comprises performing one or more of parallel interacting simulates annealing or parallel tempering optimizations.

The method can include outputting the optimal load reduction event with optimized control parameters comprises performing a load control event using the optimal load reduction event by providing energy reduction control of the multiple systems using the optimized control parameters.

The method can include determining an objective loss value for a population of the plurality of simulations and optimizing the load reduction event based on the comparison of the objective loss value for the population of the simulations.

The method can include wherein the energy consumption models represent thermal models of sites where the multiple systems are located, the thermal models including cooling properties of HVAC units located at the properties.

The method can include wherein each system includes one or more of an HVAC system and a thermostat configured to control the HVAC system.

The method can include receiving one or more inputs related to tailoring optimization of the optimal load reduction event, modifying, based on the one or more inputs, load objective components that are defined by functions of the load reduction curve, and optimizing the load reduction event based on the modified load objective components.

The method can include receiving the one or more inputs comprises receiving load dispatch inputs including one or more of time duration for the load reduction event, energy reduction for the load reduction event, and thresholds that define one or more limits on adjustment of the control parameters.

The method can include receiving the one or more inputs comprises receiving load reduction curve specification inputs including values for one or more of a total load reduction, a shape of the load reduction curve, and a noise threshold around the load reduction curve.

The method can include receiving the one or more inputs comprises receiving load reduction curve modification inputs including one or more of a manually modified load reduction curve, an automatically modified load reduction curve, and a translation of the load reduction curve to a cost curve.

The method can include receiving the one or more inputs comprises receiving time-weighted objectives that provide time-weighting of reduction curve values of the load reduction event as the reduction curve values are consumed by one or more loss functions.

The method can include determining a time difference between a current time and a time of the load reduction event, determining, based on the time difference, one or more scaling parameters, identifying, based on the one or more scaling parameters, a particular subset of the multiple systems to use as representative of all of the multiple systems, performing optimization of the load reduction event based on the particular subset of the multiple systems, the optimization of the load reduction event including modified control parameters of the particular subset of the multiple monitoring systems, and applying optimization results to all of the multiple systems based on the modified control parameters of the particular subset of the multiple monitoring systems.

The method can include identifying a system that lacks an energy consumption model, determining characteristics of the identified system, comparing the determined characteristics to types of systems involved in the load reduction event, based on comparison results, identifying a group of systems that has characteristics similar to the determined characteristics of the identified system, and using a baseline energy consumption model associated with the group of systems as an energy consumption model for the identified system.

The method can include accessing device participation prediction data corresponding to each of the multiple systems, and determining, based on the device participation prediction data, a joint probability distribution of time for each system that predicts a change in status in participating in the load reduction event.

The method can include accessing fairness tracking data corresponding to the multiple systems, accessing one or more fairness objectives corresponding to the load reduction event, evaluating the fairness tracking data against the one or more fairness objectives, based on the evaluation, identifying a subset of monitoring systems that are impacted by the one or more fairness objectives, and determining one or more restrictions to be placed on the subset of impacted monitoring systems, the one or more restrictions representing limits to modifications of the control parameters of the subset of impacted monitoring systems.

The method can include performing the plurality of simulations of load reduction events that simulate variations in control parameters used to control the multiple systems comprises perturbing the energy consumption models to produce a plurality of perturbed energy consumption models including multiple perturbed energy consumption models for each of the multiple systems.

The method can include for each simulation of each system, computing a plurality of simulation results that each correspond to one perturbed energy consumption model for the corresponding system, computing a quantile of a loss sample distribution for the plurality of simulation results, and using the quantile of the loss sample distribution for the plurality of simulation results as a simulation result for the corresponding system.

Advantageous implementations can include one or more of the following features. Load reduction optimization can include methods that assign control parameters to a population of systems, to implement a control strategy that minimizes a particular load objective. The methods can explore a plurality of different control parameters, such as temporal thermostat adjustments, for each system in the population of devices. For example, the methods can be used to optimize a load reduction event over the duration of a peak load demand. In this instance, the optimized load reduction event manages load shed across the population of systems so that customer comfort is maintained and load is reduced during the periods of peak load demand. The methods can be used to provide grid operators with more predictable control of load reduction achieved through existing approaches to load reduction events. In this instance, the grid operators may be able to choose particular load reduction curves and temperature adjustment limits for a load reduction event. The load reduction event may correspond to a particular control strategy that is used in determining an optimal load reduction event. The methods can break the load reduction event down into subproblems, and address each of the subproblems in parallel using one or more computing components in a distributed computing architecture system. The methods of the present disclosure can optimize a reduction in energy consumption against a firm load dispatch objective (e.g., a specific load reduction shape across a duration of the load reduction event), while accounting for customer comfort objectives, (e.g., temperature thresholds, fairness to customers in the load reduction events, anticipated customer participation and lack of participation, etc.).

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 12 is an exemplary diagram of a data structure for device participation prediction.

Like reference numbers and designations in the various drawings indicate like elements.

DETAILED DESCRIPTION

Figure 1:
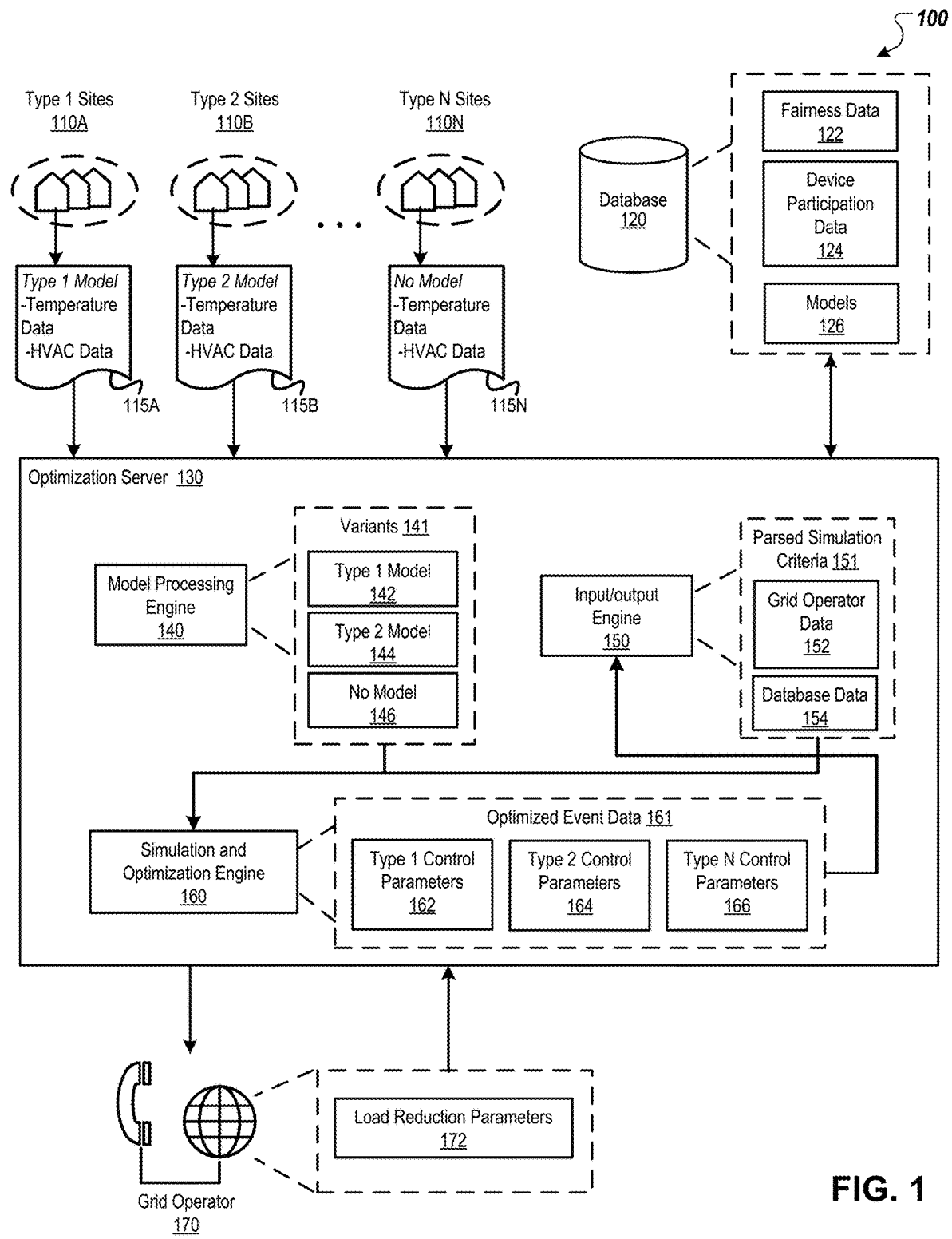
FIG. 1 is an exemplary diagram of a load reduction optimization network.

FIG. 1 is an exemplary diagram of a load reduction optimization network 100. The load reduction optimization network 100 includes multiple types of sites 110A-N, a database 120, an optimization server 130, and a grid operator 170 that are connected over a data communications network. The load reduction optimization network 100 illustrates the transfer of data between the sites 110A-N, the database 120, the optimization server 130, and the grid operator 170. The optimization server 130 uses a combination of data received from the sites 110A-N, the database 120, and the grid operator 170 to perform simulations of load reduction events. The simulated load reduction events use the received data to simulate potential control parameters for controlling energy consuming systems, such as HVAC systems, at the sites 110A-N. The control parameters in the simulations may be iteratively modified against a load reduction curve, that is provided by the grid operator 170, to selectively generate an optimal load reduction event that corresponds to defined control parameters for the systems of the sites 110A-N.

The sites 110A-N can include one or more sites, such as a house, an apartment, a commercial building, a floor of a building, a particular room in a house, apartment, or building, and the like. The sites 110A-N can include monitoring systems that are configured to collect monitoring data of the sites 110A-N. There can be one or more monitoring systems at each of the sites 110A-N. The monitoring systems can include control units configured to control a heating or cooling system located at a corresponding site 110. For example, a monitoring system can be located at a site and include a thermostat that is configured to control a heating, ventilation, and air conditioning (HVAC) system located at the site. The monitoring systems can be used to collect monitoring data corresponding to the sites 110A-N. The monitoring data can include temperature data measured inside the sites 110A-N, mode data of the sites 110A-N, state data of the sites 110A-N, setpoint temperature from the monitoring systems of the sites 110A-N, and the like.

The sites 110A-N can be categorized based on characteristics of the sites 110A-N. In this instance, the sites 110A-N may be classified or clustered according to different types. For example, the sites 110A-N may be classified according to various parameters such as energy management program participation, energy consumption model parameters, averages of energy consumption model parameters, means of energy consumption model parameters, modes of energy consumption model parameters, and the like.

The sites 110A-N can include sites located in various geographic locations, sites enrolled in various different energy management programs, sites with varying heat flow characteristics, and the like. In some aspects, each of the sites 110A-N in the population is associated with an energy consumption model. In other aspects, each of the sites 110A-N is associated with multiple energy consumption models. Each of the sites 110A-N may be identified by a corresponding energy consumption model, internal heat gain, thermal product, thermal potential, deadband, and the like. For example, each of the sites 110A-N may be associated with a corresponding thermal model that includes cooling properties of HVAC units located at the sites 110A-N.

The data of the sites 110A-N, such as device participation data 124 and model data 126, may be stored by the optimization server 130 in the database 120. In some aspects, the optimization server 130 is a database server. In this instance, the data of the sites 110A-N is stored locally at the optimization server 130. Otherwise, the data of the sites 110A-N may be stored remotely at another database, such as database 120.

The data of the sites 110A-N may be accessed by the optimization server 130, or any other remote server. The accessed data can be used to determine energy consumption model type parameters. The energy consumption type parameters can each correspond to a particular set of parameters of the energy consumption models. Further, the energy consumption model type parameters may be used to organize the sites 110A-N according to similar energy consumption models associated with each of the sites 110A-N.

In certain aspects, the optimization server 130 may receive or access representative energy consumption models 115A-N for each of the types of sites 110A-N. In other aspects, the optimization server 130 may receive or access a subset of energy consumption models 115A-N for each of the sites 110A-N that may include one or more respective energy consumption models 115A-N. As such, the cluster of type 1 sites 110A may be associated with a first representative energy consumption model 115A that corresponds to a set of temperature data and HVAC data of the type 1 sites 110A. The cluster of type 2 sites 110B may be associated with a second representative energy consumption model 115B that corresponds to a set of temperature data and HVAC data of the type 2 sites, and the like. In other aspects, the cluster of type 1 sites 110A may be associated with energy consumption model 115A, energy consumption model 115B, and HVAC data of the type 1 sites 110A. The representative energy consumption models 115A-N may be determined using the parameters of the energy consumption model type parameters. For example, the representative type 2 energy consumption model associated with the cluster of type 2 sites 110B, may be generated using the corresponding average internal heat gain and average thermal potential included in the parameters for the similar type 2 sites.

In some aspects, the representative energy consumption models may be associated with new sites that are added to the population of sites 110A-N. For example, a site may be added to the population that is not associated with an energy consumption model. The new site may be characterized according to various parameters and then associated with one or more of the representative energy consumption models using the various clusters of types of energy consumption models 115A-N. In other aspects, the new site may be characterized according to various parameters without associating one or more of the representative energy consumption models. In this aspect, the new site may be characterized according to the various parameters from other energy consumption models not associated with the new site but associated with other sites 110A-N.

The database 120 can include one or more databases that store data associated with the sites 110A-N. The database 120 can include customer comfort parameters as well as the energy consumption models 126 associated with the sites 110A-N. For example, the customer comfort parameters can include a maximum offset of temperature adjustments to the systems of the sites 110A-N, (e.g., HVAC systems located at the sites). The customer comfort parameters may account for fairness data 122 (e.g., a degree of variation in duration and magnitude of setback controls across the population, either within a single event or across multiple events), and device participation data 124 (e.g., the number of customers who participate in the load reduction event, the number of customers who do not participate in the load reduction event due to discomfort or expectation of discomfort, and the number of customers who partially participate in the load reduction event). In some aspects, the device participation data 124 includes a probability distribution, such as a joint probability distribution, of a time for each system that predicts a change in status in participating in the load reduction event. The optimization server 130 accounts for the customer comfort parameters in determining a control strategy that best meets a load reduction objective. In another example, the energy consumption models 126 may be attributed to sites individually, or to a subset of sites of the entire population of sites 110A-N. As such, the database 120 may be accessed and/or referenced by the optimization server 130 in generating an optimal load reduction event for output.

The grid operator 170 can include one or more grid operators that provide a request to implement a load reduction event. The grid operator system 110 can correspond to a particular grid operator such as a utility system, retail energy provider (REP), ISO, RTO, monitoring system aggregator, and the like. In certain aspects, a monitoring system aggregator is the grid operator 170. The grid operator 170 can determine when to implement the load reduction event via a load reduction event request, a firm load dispatch request, or any other energy management program request. In some aspects, the grid operator 170 transmits the request to the optimization server 130 to immediately execute a load reduction event. In other aspects, the grid operator 170 transmits the request to the optimization server 130 to schedule a future load reduction event. For example, the grid operator 170 can transmit a firm load dispatch request that includes load reduction parameters 172. In this instance, the load reduction parameters 172 may include constraints on the load reduction event, (e.g., a target amount of load shed, a predetermined load control window, a shape of a load reduction curve, etc.).

In some aspects, load can include physical power consumption, physical power injection, or both. In one aspect, physical power refers to real power (the real part of apparent power), and in another aspect refers to reactive power (the imaginary part of apparent power). In the case of the difference between physical power consumption and physical power injection, load may refer to net load. The net load may include the difference between physical power consumption, or gross load, and physical power injection, or generation. In particular, a monitoring system may enable or cause a site 110A to physically consume or inject power from the electric grid. In some aspects, load may be defined with respect to a single site 110A. In other aspects, load may be defined with respect to an aggregation of multiples sites 110A-110N. For instance, load may refer to the sum of the net loads of the sites in the aggregation, equal to the sum of the power consumptions minus the sum of the power injections. In another instance, load may refer to the sum of the injections of physical power of the sites in the aggregation.

In some aspects, monitoring systems 210 may be associated with physical load assets, capable of power consumption, physical generator assets, capable of power injection, or physical energy storage assets, capable of both physical consumption and injection. In some aspects, data in the energy consumption models may pertain to characteristics of the net load. For instance, the data of the energy consumption models, such as energy consumption models 115A-N, may include the capabilities, constraints, characteristics, or behavior of assets related to physical power consumption, physical power injection, or both. The data stored in the energy consumption models 115A-N can be utilized in the load reduction events. For instance, a load reduction curve in the load reduction event may refer to either the gross load, the generation, or the net load. As a result, the load reduction curve can incorporate data pertaining to physical power consumption, physical power injection, and physical power storage.

The optimization server 130 includes a model processing engine 140, an input/output engine 150, and a simulation and optimization engine 160. The model processing engine 140 receives data associated with the multiple types of modeled sites 115A-N as input, and processes the data for the entire population of sites 110A-N. In this instance, the model processing engine 140 may identify potential control parameters for each of the variants 141 of the different types of sites, such as type 1 model sites 142, type 2 model sites 144, and sites without models 146. For example, the model processing engine 140 can identify control parameters for each of the categories or clusters of site types, in which the identified control parameters may be adjusted during simulation of load control events. The model processing engine 140 can be configured to output the processed information to the simulation and optimization engine 160.

The input/output engine 151 receives grid operator data 152 and database data 154 as input. The input/output engine 151 may be a front end engine that parses the grid operator data 152 and the database data 154 for use in particular simulations. For example, the input/output engine 151 can be configured to access or pull data from the database 120 and/or the grid operator 170. In this instance, the input/output engine 151 may be used by the optimization server 130 to dynamically access data corresponding to the modeled types of sites 115A-N that are to be simulated under various conditions for optimization of a load reduction event. The input/output engine 150 can be configured to output the parsed simulation criteria 151 to the simulation and optimization engine 160. Further the input/output engine 150 can be configured to receive results from the simulation and optimization engine 160, and provide the results as output to the grid operator 170 for management and/or confirmation of a proposed, optimal load reduction event.

The simulation and optimization engine 160 is configured to perform a plurality of simulations of load reduction events for a subset of the sites 110A-N. The simulations of load reduction events may each include varied control parameters for each of the different types of sites 110A-N. The control parameters may be adjusted individually, and in parallel, for each of the types of sites 110A-N so that the control parameters are varied for the population of sites as a whole 110A-N over the duration of simulated load reduction event. For example, the simulation and optimization engine 160 can be configured to perform simulations of load reduction events that simulate variations in control parameters used to control systems of the sites 110A-N. The simulation and optimization engine 160 may be configured to generate an optimal load reduction event based on an optimized set of event data 161, (e.g., a single set of control parameters for each of the sites 110A-N that optimizes a load reduction event over the population of sites 110A-N). In this instance, the simulation and optimization engine 160 can be configured to optimize the load reduction event by iteratively modifying type 1 control parameters, type 2 control parameters, type N control parameters, and so on. In some aspects, the control parameters may be iteratively modified against a load reduction curve as specified by the grid operator 170.

The simulation and optimization engine 160 can be configured to access in energy consumption model data and grid operator data, to determine a mapping of control parameters for systems associated with the sites 110A-N. In this instance, the simulation and optimization engine 160 defines a mapping of control parameters for the population of sites 110A-N, through simulations of energy consumption at the sites 110A-N. The simulation and optimization engine 160 can be configured to output the optimal load reduction event to the input/output engine 150. For example, the optimal load reduction event may be provided to the input/output engine 150 when the simulation and optimization engine 160 reaches one or more predetermined termination conditions for optimization. The input/output engine 150 may receive the optimal load reduction event and forward the optimal load reduction event with optimized control parameters to the grid operator 170.

Figure 2:
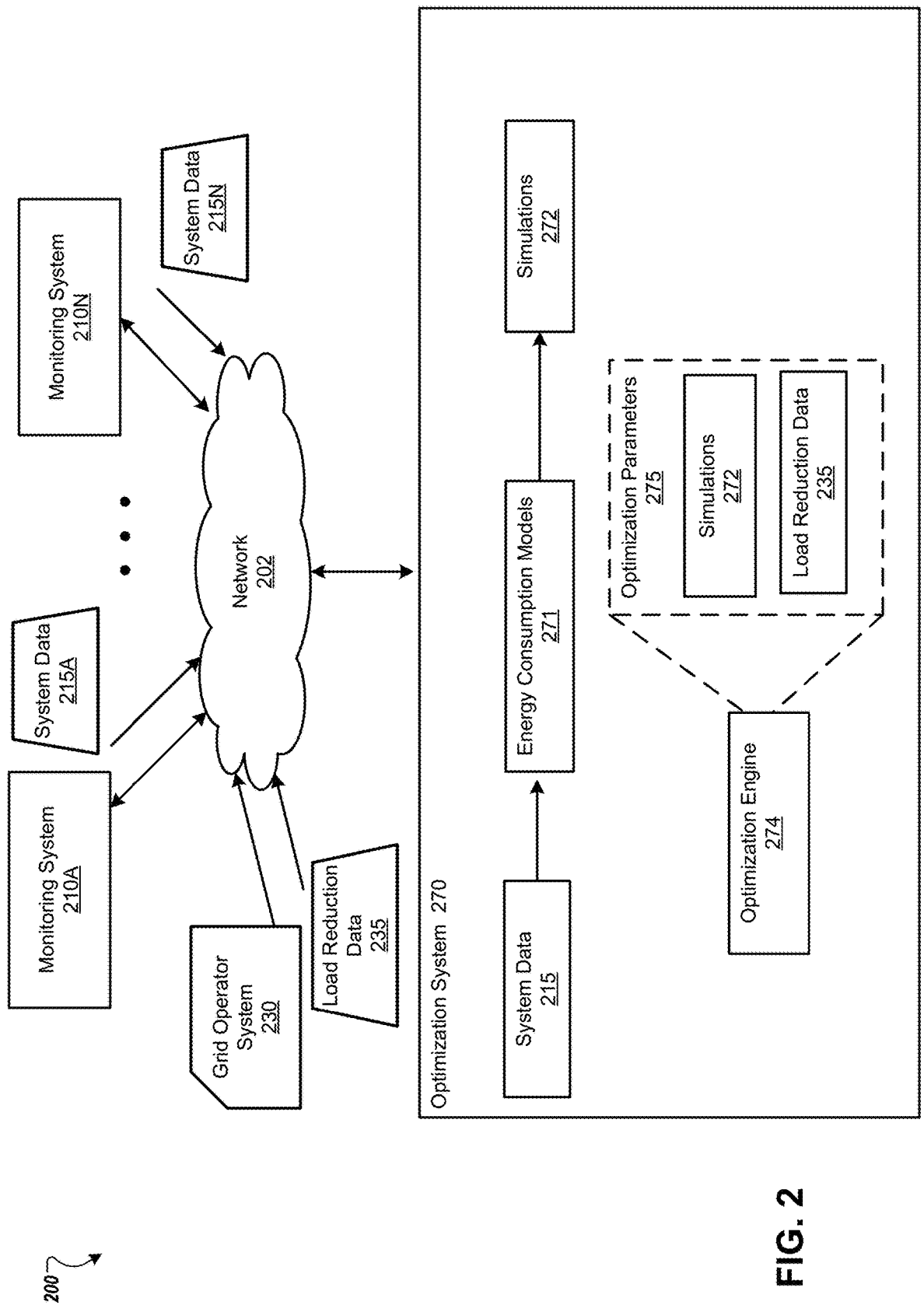
FIG. 2 is an exemplary diagram of a load reduction optimization system.

FIG. 2 is an exemplary diagram of a load reduction optimization system 200. The load reduction optimization system 200 includes a network 202, such as a local area network (LAN), a wide area network (WAN), the Internet, or any combination thereof. The network 202 connects monitoring systems 210A-N, a grid operator system 230, and an optimization system 270. The load reduction optimization network 200 may include many different monitoring systems 210A-N, grid operator systems 230, and optimization systems 270.

The monitoring systems 210A-N can include energy consuming systems, energy consuming devices, and/or energy controls for energy consuming devices such as an HVAC system, a thermostat, a heating/pump system, an electric vehicle, a solar-power system, electric resistive or heat pump water heater, and the like. The monitoring systems 210A-N can each be associated with a site, such as a house, an apartment, a floor of a building, a particular room in a house, apartment, or building, and the like. In some aspects, the monitoring systems 210 are configured to adjust energy consumption at the sites via control units located at the sites. In other aspects, the monitoring systems 210 can be configured to adjust energy consumption of energy consuming devices at the sites via control units located at the sites. For example, if a particular monitoring system corresponds to an HVAC system connected to a thermostat, the particular monitoring system can be configured to monitor temperature at the site and adjust the temperature of the thermostat, thereby adjusting the energy consumption of the HVAC system.

The monitoring systems 210A-N can each be associated with system data 215A-N. The system data 215A-N can include historical data corresponding to each of the monitoring systems 210A-N. For example, if a particular monitoring system corresponds to an HVAC system connected to a thermostat, the system data 215 can include previous temperature data as well as HVAC runtime data. Further, the system data 215 can include adjustments to a particular monitoring system based on previously implemented control. For example, the system data 215 can include data indicating temperature adjustment information as well as a duration of the temperature adjustments.

The grid operator system 230 can include can include one or more grid operator systems connected to the monitoring systems 210 and the optimization system 270 via the network 202. The grid operator system 230 can include a computer system used by a grid operator that provides energy to the sites associated with the monitoring systems 210A-N.

The grid operator system 230 can provide load reduction data 235, such as load reduction requests and energy load information, to the optimization system 270. The load reduction requests can include one or more requests for a control strategy to be generated at the optimization system 270 regarding the execution of a load reduction event with defined control parameters. The load reduction event can include an adjustment to the energy consumption of energy consuming devices associated with the monitoring systems 210. For example, a load reduction request can include a request for a load reduction event over a predetermined period of time. As such, the load reduction request can indicate a start time and an end time to the load reduction event. The load reduction request can also include load reduction parameters for the load reduction event. For example, the load reduction parameters can include a maximum offset of temperature adjustments to the monitoring systems 210. In another example, the load reduction parameters of the firm load dispatch request can include a particular reduction in energy consumption. Further, the load reduction parameters of the load reduction request can include a target amount of load shed or target load curve shape. The firm load dispatch request can be provided to the optimization system 270 so that the optimization system 270 can determine an optimal load reduction event with optimized control parameters that leverages each of the monitoring systems 210 and controls the monitoring systems 210 in a coordinated manner.

The optimization system 270 can be connected to the monitoring systems 210 and the grid operator 230 via the network 202. Further, the optimization system 270 can be configured to receive system data 215 of the monitoring systems 210, and load reduction data 235 of the grid operator 230 via the network 202. The optimization system 270 can include energy consumption models 271, simulations 272 corresponding to the energy consumption models 271, and an optimization engine 274 for optimizing a load reduction event based on the simulations 272. The optimization system 270 can be configured to optimize a load reduction event in response to receiving grid operator data 235, such as a load reduction request from the grid operator system 230. In certain aspects, the optimization engine 274 can also perform optimization using a load reduction curve included in the grid operator data 235.

The optimization system 270 is configured to explore a space of control strategies, in which control parameters are assigned to the monitoring systems 210A-N. The optimization system 270 explores the space of control strategies to arrive at an optimal load reduction event with optimized control parameters. Specifically, the optimization system 270 uses the system data 215, which may include and/or be associated with energy consumption models 271 for sites that correspond to the monitoring systems 210A-N, in combination with the load reduction data 235 to perform a "noisy descent" in the space of control strategies. The optimization system 270 performs the simulations to optimize a load reduction event against a load reduction curve of the load reduction data 235.

The optimization system 270 can include an optimization engine 274 configured to optimize the load reduction event using optimization parameters 275, such as the generated simulations 272 and the load reduction data 235. In some aspects, the optimization engine 274 performs interacting, simulated annealing and/or parallel tempering on the optimization parameters 275 to optimize the load reduction event. For example, the optimization engine 274 can use simulated annealing to perform the "noisy descent" of simulations in the space of potential control strategies. In this instance, the optimization engine 274 uses simulated annealing to reduce energy consumption of the sites that correspond to the monitoring systems 210A-N. The optimization engine 274 considers incremental steps of the simulations 272 and accepts/rejects the steps probabilistically, based on the annealing energy associated with each simulated control strategy. The following paragraphs provide a specific example for purposes of illustrating optimization of a load reduction event, and this description is not intended to limit the score of the disclosure.

The optimization engine 274 can be configure to normalize the energies associated with states of the monitoring systems 210A-N by a temperature, called the annealing temperature, which corresponds to a value that is large at outset and steadily reduced throughout the optimization, encouraging energy descent. Specifically, the probability of accepting a state with energy E' given a current state with energy E over the annealing Temperature T is the following:

$$P(E'|E, T) = \begin{cases} 1, & E' \leq E \\ \exp\left[-\dfrac{E' - E}{T}\right], & \text{otherwise} \end{cases} \quad (A)$$

Referring to equation (A) above, the function references the energy delta between the states, rather than of the general, individual energies consumed by systems or devices of the sites, (e.g., the monitoring systems 210A-N or energy consuming devices associated with the monitoring systems 210A-N). Combined with a proposal distribution of g(E'|E,T) that is symmetric in E' and E, the optimization process constitutes a reversible Markov chain that converges exponentially quickly to a unique equilibrium distribution. In an example where the limit of annealing Temperature (T) approaches zero, equilibrium becomes the minimum energy state.

The optimization engine 274 can be configured to perform optimization of a population of devices in parallel. The optimization engine 274 may reduce runtime by partitioning the population of monitoring devices 210A-N into subpopulations. In some aspects, the subpopulations may be of equal sizes (e.g., each subpopulation includes an equal number of monitoring devices 210A-N). The optimization engine 274 can be configured to perform an optimization epoch, in which a predetermined number of iterative simulations are performed, and then the results are brought back together to redefine a target load curve for each subproblem. By performing a fixed number of iterations, the optimization engine 274 ensures the subproblems are addressed in parallel to collectively approach a global solution (e.g., an optimal load reduction event). The optimization engine 274 can merge the states of each subproblem to determine a global annealing energy at the end of each optimization epoch, and assign new target load curves to each of the subproblems (e.g., modified load reduction curves).

The optimization engine 274 can be configured to optimize the load reduction event by determining an objective loss value for the subproblems collectively. In some aspects, the objective loss value is identified as a global annealing energy. The objective loss value may be compared to an initial and a lower bound energy to determine a relative success of a particular load reduction event. Additionally, subproblem-based parallelization can be bound by a mean loss of the individual subproblems. In this instance, if the subproblems are adjusted to match target load curves that correspond to each of the subproblems, the global problem is likely to match a global target (e.g., a load reduction event optimized against a load reduction curve) as well. The property of the global problem matching the global target is a consequence of the convexity of the total loss L as a function of reduction R, L(R), as well as the subproblem target reassignment (e.g., after each iteration epoch), that the individual target curve $T_i$ sum to the global, load reduction curve T.

Consider n subproblems with $N_i$ number of monitoring systems 210A-N that sum to N. The sub letter "i" of the number of monitoring systems 210A-N is the index of the subproblem. Let $C_i$ be the individual load curves of the subproblems and $R_i = T_i - C_i$ the load reduction curves of the subproblems, with C as the total, population load reduction curve, and $R_{pop}$ as the reduction curve of a given population.

$$L\left(\frac{R_{pop}}{N}\right) = L\left(\frac{T-C}{N}\right) = L\left(1/N \sum\nolimits_{i=1}^{n} (T_i - C_i)\right) = \quad (B)$$

$$L\left(1/N \sum\nolimits_{i=1}^{n} R_i\right) = L\left(\sum\nolimits_{i=1}^{n} \frac{N_i}{N} \frac{R_i}{N_i}\right) \leq \sum\nolimits_{i=1}^{n} \frac{N_i}{N} L\left(\frac{R_i}{N_i}\right)$$

Referring to equation (B) above, the final inequality follows from the convexity of L and the fact that the coefficients $N_i/N$ represent a convex weighting of the mean subproblem reductions $R_i/N_i$.

The optimization engine 274 can be configured to perform the above-mentioned steps until one or more termination conditions are reached. For example, the optimization engine 274 can be configured to perform optimization until an iteration limit is reached. In this instance, the optimization engine 274 reaches a specified limit of allowed iterations, and then halts optimization. Due to energy sampling constraints, the iteration limit may be low, such as on the order of several thousand. In another example, the optimization engine 274 can be configured to perform optimization until a target energy is achieved. In this instance, a target or global energy is determined to be reached. The target energy can be an arbitrary parameter of the optimization, but in production is set to an energy lower bound that is not intended to be reached during runtime. In another example, the optimization engine 274 can be configured to perform optimization until an event start is reached (e.g., a load reduction event begins). In this instance, a load reduction event may be predefined to begin at a certain point in time. The optimization engine 274 can perform optimization until the beginning of the load reduction event, until a predetermined point in time before the load reduction event, and so on.

Unlike traditional simulated annealing, which relies on a deterministic energy function, the optimization engine 274 performs a stochastic version of simulated annealing. The stochastic version of annealing energy used by simulated annealing is sampled by the optimization engine 274. In this instance, Markov Chain Monte Carlo (MCMC) is used to explore a space of control strategies, and Monte Carlo (MC) sampling is used to estimate the quality of each particular strategy. The optimization engine 274 uses a modeling assumption to treat annealing energy (i.e. objective loss) as a random variable. Therefore, the optimization engine 274 assumes uncertainty in the energy consumption models 271 used to simulate load reduction events, and therefore samples from equiprobable perturbations of the models during simulations. The same small set of perturbations are applied to each of the energy consumption models 274, which yields a combinatorial number of aggregate (population) load curves (e.g., load reduction curves). In this instance, the aggregate load reduction curve is a random variable, which the optimization engine 274 samples.

The optimization engine 274 can be configured to use a variant of Gibbs sampling, which is typically defined as MCMC in which only one component, (e.g., load reduction parameter), is updated at a time, with energy conditioned on the current values of the other components. In this instance, the load reduction curves are fixed at their current value rather than being resampled each time a current and proposed device control is evaluated for quality. An additional benefit of this is that the computational time of energy sampling is independent of the number of devices, unlike in direct sampling.

An important extension to the Gibbs setup is required, however, on account of the energy itself being random. The "fixed" load curves, associated with the initial parameters of the monitoring systems 210A-N, must also be sampled. We end up with an M×N sampling matrix as shown below:

$$(C) \quad C = (C_i^j) = \begin{pmatrix} C_1^1 & C_2^1 & \dots & C_N^1 \\ C_1^2 & C_2^2 & \dots & C_N^2 \\ \vdots & \vdots & \dots & \vdots \\ C_1^M & C_2^M & \dots & C_N^M \end{pmatrix}$$

Referring to equation (C), $C_i^j$ denotes the jth load curve sample associated with a current monitoring system control of the ith monitoring system, (e.g., parameters of the ith monitoring system). Direct MC may be recovered by making the CO mutually independent, and resampling the parameters of the monitoring system every iteration to consider a new parameter (e.g., evaluating proposed load reduction parameters during simulations).

The annealing energy of the sample matrix C can be computed by first calculating aggregate load curve samples:

$$(D) \quad S^j(C) = \frac{1}{N} \sum_{i=1}^{N} C_i^j$$

Using equation (D), let P denote the number of periods in the load reduction event and L be the loss functional of an aggregate load curve, as specified in the received load reduction objective. In this instance, the jth sample energy is as follows:

$$(E) \quad E^j(C) = L(S^j(C))$$

The optimization engine 274 can be configured to use a robust statistic, such as the median, to arrive at a single, scalar energy estimate, as shown below:

$$(F) \quad \tilde{E}(C) = \text{median}\{L(S^j(C))\}_{j=1}^{M}$$

In using a version of Gibbs sampling, the columns of the matrix (e.g., the matrix in equation (C)), are unchanged until a new proposal is considered (e.g., a new set of load reduction parameters). In this instance, a column of the matrix is sampled from the proposed monitoring system control's set of load curves. The size of the column, K, will generally be smaller than M, the number of rows required. In some aspects, the column(s) is sampled using balanced sampling. The purpose of using balanced sampling is to maintain unbiasedness among the load reduction curve samples, while minimizing variance in their representation among the column sample.

A requirement of the balanced sampling is that M is required to be an integer multiple of K. The optimization engine 274 defines the sample set of load curves to be a bootstrapped sample of the K load curves, such that each curve is represented the same number of times. For example, if there are K=4 model perturbations leading to 4 MC-simulated load curves, and M=12 rows in the sample matrix, each curve will be represented exactly 3 times in each sampled column.

If the optimization engine 274 samples a column during the optimization process, the optimization engine 274 samples a permutation of size M sample set uniformly at random, which assigns a load reduction curve to a row. In this way, while the representation of load curves in each column sample of a monitoring system control, (e.g., a set of load reduction parameters for the monitoring system) remains fixed, the membership of the column sample in each row ("scenario") varies randomly between samples. This column sampling technique is used not only when considering a proposed monitoring system control, but also when constructing the initial sample matrix. At that time, the ith column is sampled from that monitoring system's initial control, independent of all other columns.

The optimization engine 274 can be configured to perform the above-mentioned balanced sampling for a variety of advantageous features. Balanced sampling provides a lower variance than sampling with replacement. Further, balanced sampling generates an even representation of load reduction curves, and thereby remains unbiased with respect to any one of the load reduction curves. By establishing a fixed sample set per load reduction control strategy, only allowing permutations to vary among samples, the unbiasedness extends to unbiasedness between samples. Therefore, the optimization engine 274 performs optimization that is prevented from selecting samples that consist of load reduction curves that disproportionately reduce aggregate loss (e.g., 9 out of 10 samples equal to the load reduction curve with smallest, flattest load).

By constructing the sample matrix and resampling a column, the optimization engine 274 evaluates a proposed control for a monitoring system, (e.g., a set of load reduction parameters for a particular monitoring system). The optimization engine 274 swaps out the i column of the sample matrix and samples the column from the current control of the monitoring system, with a new column sampled from the proposal. This yields a proposal matrix as shown below:

$$(G) \quad \tilde{C} = \begin{pmatrix} C_1^1 & C_2^1 & \dots & \tilde{C}_i^1 & \dots & C_N^1 \\ C_1^2 & C_2^2 & \dots & \tilde{C}_i^2 & \dots & C_N^2 \\ \vdots & \vdots & \dots & \vdots & \dots & \vdots \\ C_1^M & C_2^M & \dots & \tilde{C}_i^M & \dots & C_N^M \end{pmatrix}$$

Referring the equation (G), the proposal matrix includes a matrix with a changed ith column. The optimization engine 274 computes the energy delta as the median of differences, as shown below:

$$(H) \widetilde{\Delta E}(C, \tilde{C}) = med\{L(S^j(\tilde{C})) - L(S^j(C))\}_{j=1}^M$$

Using equation (H), sample load curves from two device controls are compared head-to-head for each fixed, load reduction curve sample. In this instance, each sample energy delta is insensitive to the energy scale of the fixed, load reduction curve. Since the median is chosen as a sample statistic, the true value is proportional to its condition expectation with respect to the fixed, load reduction curve F. The proportionality depends on the marginal probability of the fixed curve; which Gibbs sampling ignores by design: It contains precisely those components of the solution not up for consideration. The conditional expectation is the quantity computed under the "median of deltas" approach. It can be contrasted with pulling the conditioning operator inside the (nonlinear, nonconvex) median function, an unjustified simplification, resulting in the "delta of median" formulation as shown below:

$$(I) \mathbb{E}\ [med(L(F,\tilde{C}))|F] - \mathbb{E}\ (me\ d(L(F,C))|F]$$

Upon accepting a proposal based on the calculated energy delta, two operations are required. The optimization engine 274 updates the sample matrix and defines the new current annealing energy, for comparison with the next proposal. The latter is not trivial, since the proposal's acceptance is based on a delta statistic, rather than a direct statistic of the new load reduction control strategy. The former is also complicated, since this update is also responsible for statistical mixing of the sample matrix, which must be completely resampled over time, without overfitting on previous samples. The two operations are intertwined, and as such, bias may cause the operations to creep in between the implied energy of the current sample matrix and the recorded current energy. The Gibbs approach outlined above achieves objectives of bias elimination.

The optimization engine 274 can be configured to consider sample matrix updates even if the proposal is rejected. This is important because, when resampling the columns, a mutual dependence is developed upon proposal rejection. As such, the optimization engine 274 may be configured to evaluate a new column from the proposed control parameters for a particular device. The optimization engine 274 evaluates the energy delta with respect to the existing column, representing existing control parameters, and discards the load reduction curve sample. If the load reduction curve sample is accepted, the optimization engine 274 generates a new sample from the proposed control parameters and inserts the new sample into the sample matrix, thereby replacing the existing column. Otherwise, if the load reduction curve sample is rejected, the optimization engine 274 generates a new sample from the existing control parameters, and inserts this new sample into the sample matrix, thereby replacing the existing column. After determining accepting or rejecting the proposed sample, the optimization engine 274 records the energy of the new state of the particular monitoring system as the implied energy of the updated matrix.

A significant feature of the above-mentioned process is the permutation of the surviving column after acceptance or rejection. The permutation of the surviving column in the sample matrix is resampled on the order of every optimization iteration. Further, each column is dependent on the other columns through the underlying monitoring system control parameters, not the manner in which the load reduction curves are sampled (e.g., the permutation of the load reduction curves).

The optimization engine 274 assigns subproblems "i" new load reduction targets following each optimization epoch, based on the state of each subproblem, as well as the states of other subproblems. Given the target load curve T and the subproblem load reduction curves at the end of epoch k−1, the optimization engine 274 determines the optimal subproblem target curves for epoch k. The optimal subproblem target curves address each of two conditions of a global optimization problem of the population of monitoring systems 210A-N, the two conditions are shown below:

$$\operatorname{argmin}_{T_i^k} \sum_{i=1}^{n} \frac{1}{2} \|T_i^k - C_i^{k-1}\|^2 \quad (J1)$$

$$\text{s.t.} \sum_{i=1}^{n} T_i^k = T \quad (J2)$$

The optimization engine 274 is configured to select a set of targets that most closely match respective, current load reduction curves. The set of targets are selected from among targets that ensure the global consistency condition (J2), that they add up to the (fixed) population target. The sum in condition (J1), which is equivalent to the uniform sum of squares of all the individual load curve points, can be justified by several features. For example, condition (J1) shows no preference for one subproblems or load reduction period over another subproblem or load reduction period. In another example, condition (J1) includes a loss that further penalizes the shifting of the size of load curve-to-target gap from one set of subproblems to another, ensuring an equally shared penalty among the subproblems. In another example, condition (J1) includes a loss that makes the global optimization problem analytically solvable.

The problem conditions of (J1) and (J2) above can be solved using Lagrange multipliers, in which case the ith multiplier is a consistency restoring force. Alternatively, the ith multiplier can be recognized as the loss projection to the subspace defined by (J2). In this instance, the solution to the problems conditions can include the following:

$$T_i^k = C_i^{k-1} + \frac{1}{N} R^{k-1} \quad (K)$$

Referring the equation (K), the solution implies that a new target for each subproblem is simply its current load shape, offset by the current population reduction, normalized to be per-system (e.g., per each monitoring system).

The optimization engine 274 can be configured to perform optimization of a load reduction event over a control space that includes various setback events. The setback events may be iteratively modified through simulations of perturbed energy consumption models 271. In this instance, the optimization engine can use the energy consumption models 271 and the load reduction data 235 to compute a plurality of simulation results that each correspond to one perturbed energy consumption model for a corresponding monitoring system. The optimization engine 274 can also be configured to compute a quantile of a loss sample distribution for the plurality of simulation results and use the quantile of loss sample distribution for the plurality of simulation results as a result for the corresponding monitoring system.

The optimization system 270 can be configured to provide results of the optimization engine 274 as output. For example, the optimization system 270 can output an optimal load reduction event with optimized control parameters. In this instance, the optimization system 270 may perform a load control event using the optimal load reduction event by providing energy reduction control of the monitoring systems using the optimized control parameters.

Figure 3:
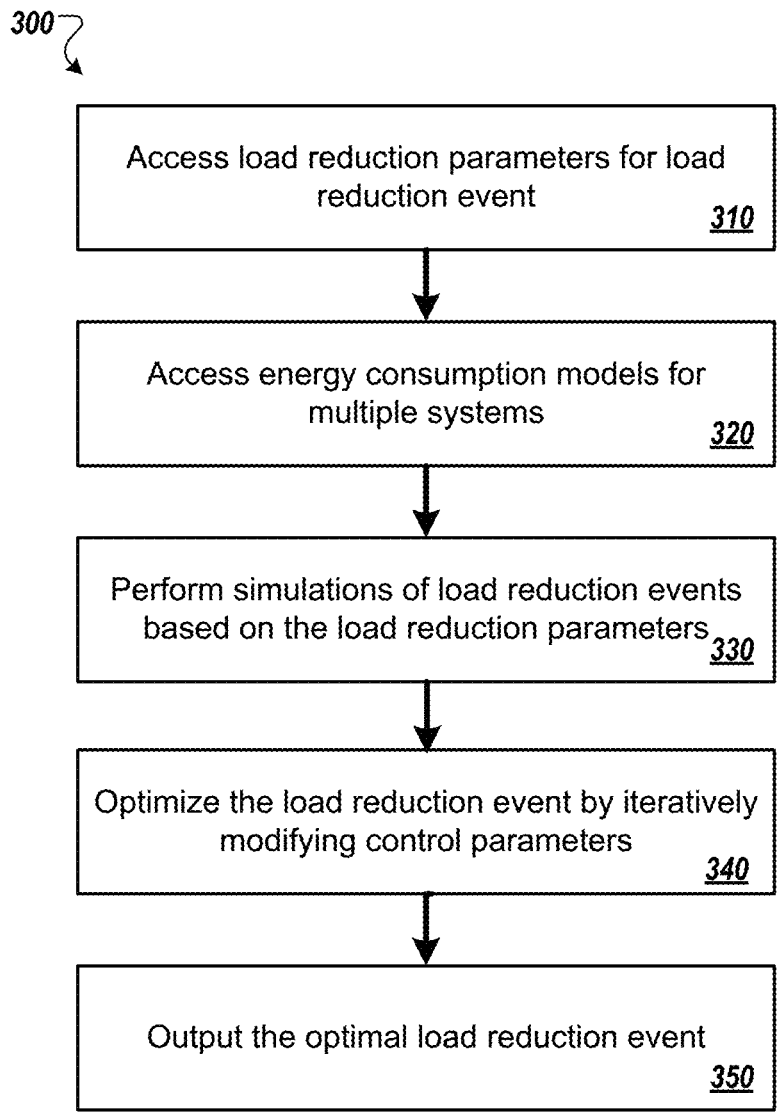
FIG. 3 is a flow chart illustrating an example process for determining and providing optimal control parameters.

FIG. 3 is a flow chart illustrating an example process 300 for determining and providing optimal control parameters. For convenience, the process 300 will be described as being performed by a system of one or more computers located in one or more locations. For example, an optimization server, e.g., the optimization server 130 of FIG. 1, can perform the process 300.

At step 310, the optimization server accesses load reduction parameters for a load reduction event. The load reduction parameters can include load reduction data provided by a grid operator. The load reduction data may correspond to a plurality of monitoring systems associated with sites that are enrolled to participate in a load reduction event.

At step 320, the optimization server accesses energy consumption models for multiple systems. The optimization server can be configured to access one or more energy consumption models for each of the monitoring systems. Alternatively, a monitoring system may not include an energy consumption model. In some aspects, the energy consumption models may be transmitted to the optimization server from a remote server or computing device. In other aspects, the energy consumption models are stored locally at the optimization server, and accessed according to the load reduction parameters that indicate which monitoring systems, and corresponding sites, are enrolled in the load reduction event.

At step 330, the optimization server performs simulations of load reduction events based on the accessed load reduction parameters. The simulations may simulate variations in control parameters used to control the monitoring systems. The optimization server can be configured to perform the simulations for each of the monitoring systems in parallel. In some aspects, the optimization server can be configured to sample the simulations to determine an overall quality of the simulations at each iteration.

At step 340, the optimization server optimizes the load reduction event by iteratively modifying the load reduction parameters. The optimization server may optimize the load reduction event by modifying the load reduction parameters used in the plurality of simulations of load reduction events. The load reduction event may be optimized against a particular load reduction curve. In this instance, the particular load reduction curve may be provided by a grid operator and associated with a requested load reduction event.

At step 350, the optimization server outputs the optimal load reduction event with optimized load control parameters. The optimization server can be configured to output the optimal load reduction event to a grid operator for review. In some aspects, the optimization server can be configured to output the load reduction event to the monitoring systems directly. In this instance, the optimization server can be configured to provide the optimized load control parameters to each of the corresponding systems so that the optimized load event may be dispatched with enough time for the monitoring systems to respond to the dispatch (e.g., perform actions that correspond to the optimized load control parameters).

Figure 4:
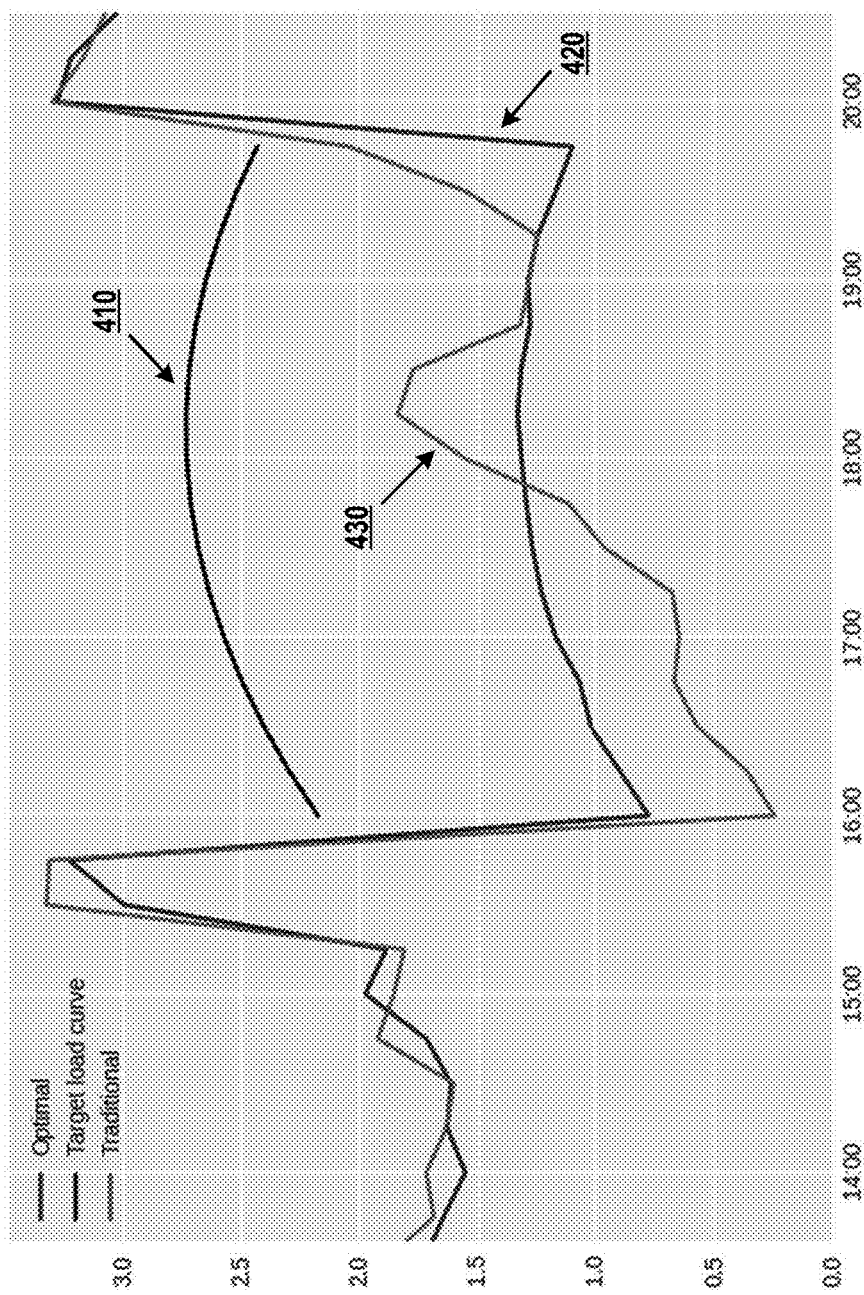
FIG. 4 is an exemplary diagram for target load curve matching.

FIG. 4 is an exemplary diagram for target load curve matching 400. The diagram for target load curve matching 400 includes a target load curve 410, a traditional load curve 420 and an optimal load curve 430. The target load curve 410 represents a target load curve provided by a grid operator according to a requested load reduction event. The target load curve 410 can be associated with a firm load dispatch objective in determining an optimal load reduction event. The traditional load curve 420 represents the implementation of traditional setback events without firm load dispatch, in which all monitoring systems, such as energy consumption devices, share the same setback control which are scheduled to begin at the outset of a load reduction event. For example, the traditional load curve 420 can represent an amount of load consumed by sites over the duration of a load reduction event without firm load dispatch. In this instance, the grid operator may manage the load during a period of high energy consumption without accounting for occupant comfort.

On the other hand, the optimal load curve 430 represents the implementation of setback events determined from an optimized load reduction event. In this instance, the optimal load curve 430 represents a flat amount of load reduction with respect to the target load curve 410. This flat amount of load dispatch indicates that the energy consumption devices act collectively as a stable generation resource for the grid operator over the duration of the load reduction event.

Figure 5:
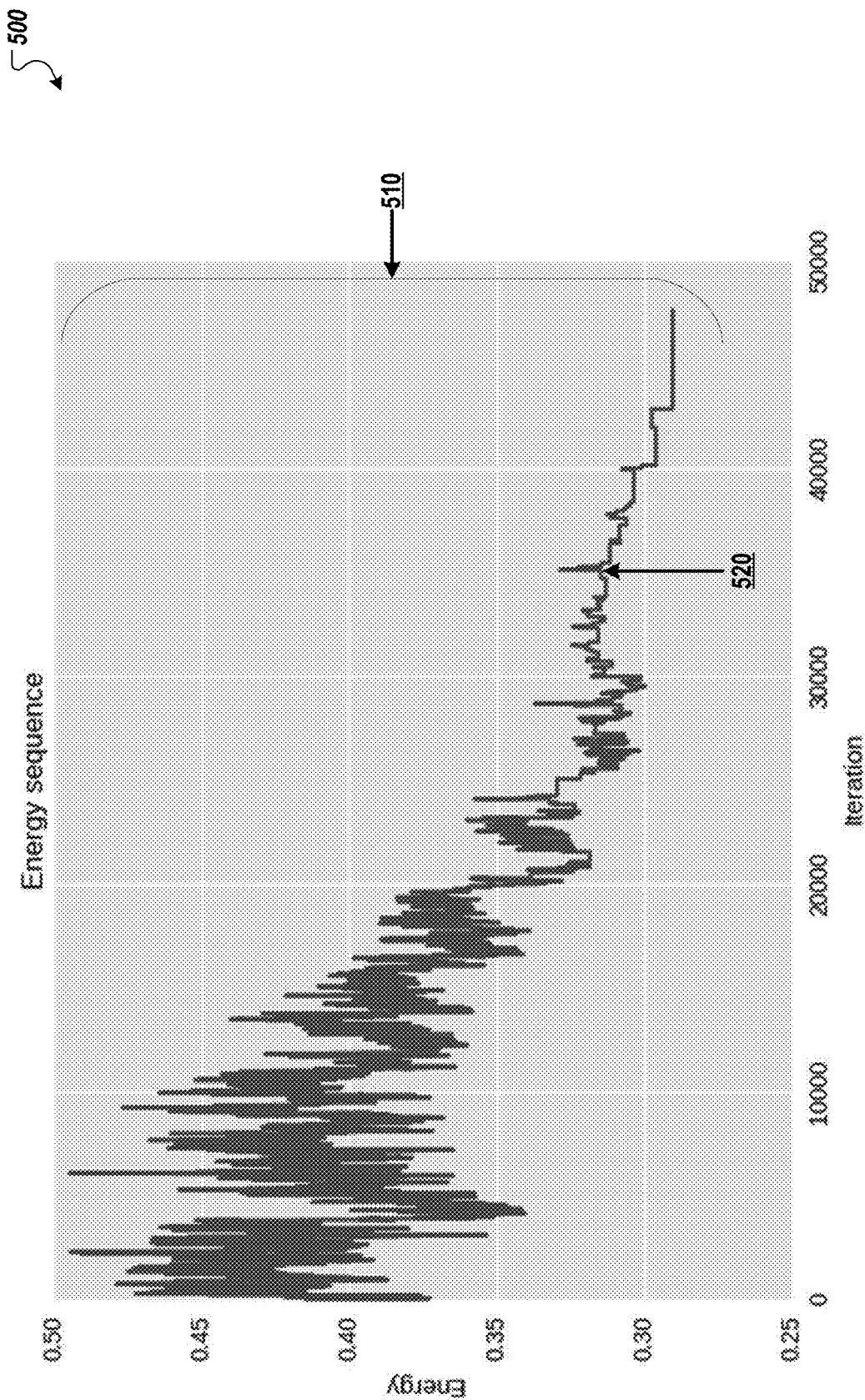
FIG. 5 is an exemplary diagram for optimizing load reduction parameters.

FIG. 5 is an exemplary diagram for optimizing control strategy parameters 500. The diagram for optimizing control strategy parameters 500 illustrates a time series of annealing energy 510 through the course of optimization, which incorporate objective loss. Each point in the time series represents annealing energy at a single iteration 520 of the optimization and further, corresponds to the control strategy considered at each iteration 520. The diagram for optimizing control strategy parameters 500 further illustrates the optimization of control parameters against a load reduction objective using a simulated annealing-based technique. The fluctuations of the annealing energy 510 at low iterations reflect exploratory behavior during the outset of optimization, when the annealing temperature is high, following by hill climbing behavior when the annealing temperature is low, at higher iterations. The optimization engine 274 can employ one or more optimization techniques, such as simulated annealing, in parallel over one or more subsets of the population of sites as a whole to ultimately determine an optimal control strategy.

An optimal load reduction event may be determined for the sites after iterating through a number of control strategies. Each of the potential control strategies can correspond to a particular set of modified control strategy parameters based on the optimization techniques. The control strategy parameters can be modified against a load reduction objective that includes a customer objective. In certain aspects, the control strategy parameters can be modified to reduce a total amount of energy consumed by the sites.

In some aspects, the iterations modify the control strategy parameters using information learned from previous iterations. In certain aspects, the optimization server performs parallel variants of simulated annealing using the control strategy parameters to determine an optimized load reduction event. In this instance, the optimization techniques enable the optimization server to optimize a load reduction event with a particular set of control parameters.

Figure 6:
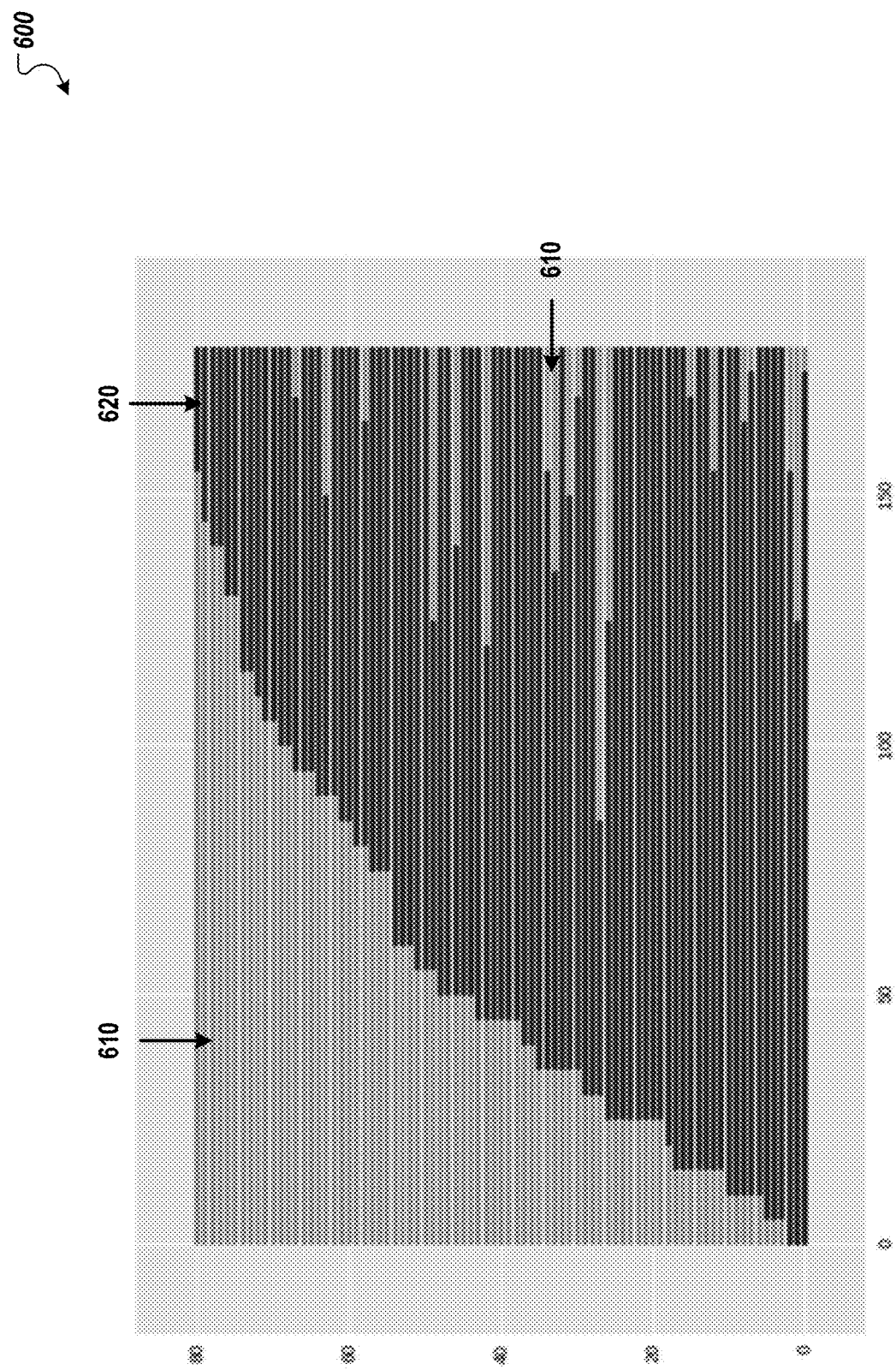
FIG. 6 is an exemplary diagram of setback events.

FIG. 6 is an exemplary diagram of setback events 600. The diagram of setback events 600 illustrates the optimization server providing setback events to monitoring systems over the duration of a load reduction event. Specifically, FIG. 6 illustrates setback events being provided to each of a plurality of monitoring systems, such as energy consumption systems, for a load reduction event.

The diagram of setback events 600 includes horizontal bars that represent the control of individual monitoring systems (each bar may correspond to a particular monitoring system.) The light-shaded horizontal bars 610 represent monitoring systems that are in a state prior to or following the implementation of setback events. On the other hand, the dark-shaded horizontal bars 620 represent monitoring systems that are undergoing setback events at particular points in time.

Over the duration of the load reduction event, a subset of monitoring systems enrolled in the load reduction event are provided with setback events. The setback events 600 correspond to a single control strategy. Referring to FIG. 6, the monitoring systems may include differing dispatch times, as indicated by beginning and end of each dark-shaded horizontal bar 620.

As such, the control strategy implemented by the optimization server may not utilize all of the enrolled sites or monitoring systems associated with the sites. Additionally, the control strategy implemented by the optimization server may not need to provide adjustments over the entire duration of the optimized load reduction event to each of the monitoring systems being adjusted.

Figure 7:
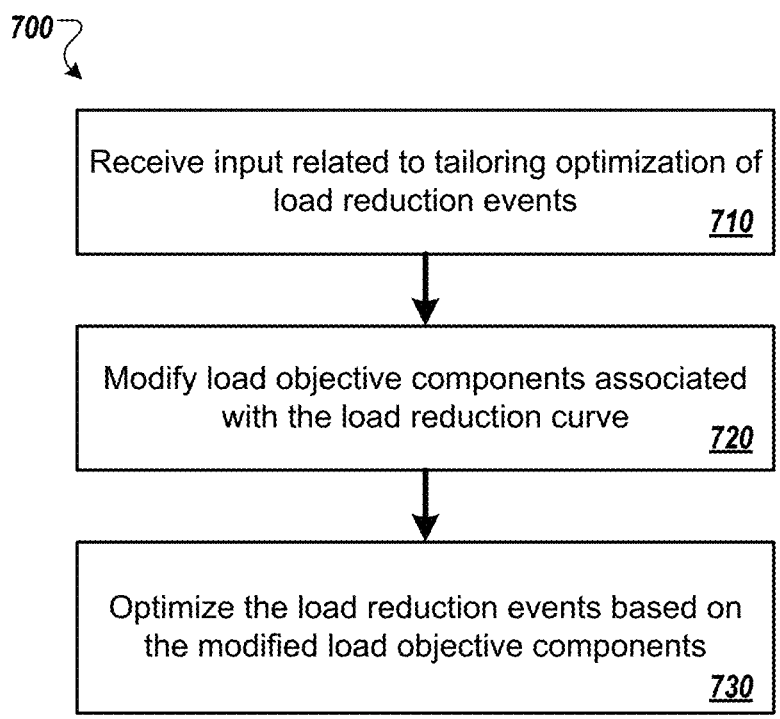
FIG. 7 is a flow chart illustrating an example process for optimizing load reduction events based on modified optimization parameters.

FIG. 7 is a flow chart illustrating an example process 700 for optimizing load reduction events based on modified optimization parameters. For convenience, the process 700 will be described as being performed by a system of one or more computers located in one or more locations. For example, an optimization server, e.g., the optimization server 130 of FIG. 1, can perform the process 700.

At step 710, the optimization server receives input related to tailoring optimization load reduction events. For example, the optimization server can receive one or more inputs related to tailoring optimization of the optimal load reduction event. The optimization server can be configured to receive load dispatch inputs. The load dispatch inputs can include a time duration for the load reduction event, energy reduction for the load reduction event, threshold that define limits on adjustment of the control parameters, and the like. The optimization server can also receive load reduction specification inputs such as values for a total load reduction, a shape of the load reduction curve, a noise threshold around the load reduction curve, and so on. In some aspects, the optimization server receives load reduction modification inputs including a manually modified load reduction curve, an automatically modified load reduction curve, a translation of the load reduction curve to a cost curve, and the like. Further, the optimization server can be configured to receive time-weighted objectives that provide time-weighting of reduction curve values of the load reduction event as the reduction curve values are consumed by one or more loss functions.

At step 720, the optimization server modifies load objective components associated with the load reduction curve. In some aspects, the optimization server modifies the load objective components that are defined by functions of the load reduction curve, based on the received inputs.

At step 730, the optimization server optimizes the load reduction event based on the modified load objective components.

Figure 8:
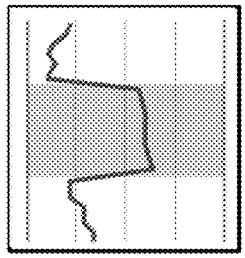
FIG. 8 is an exemplary diagram of a user interface for optimization parameters.

FIG. 8 is an exemplary diagram of a user interface 800 for optimization parameters. The user interface 800 illustrates a user interface for implementing and/or dispatching a load reduction event. The user interface 800 includes various parameters that may be adjusted in preparation of dispatching and generating an optimal load reduction event. For example, the user interface 800 can be used by a grid operator to provide load reduction data to an optimization server for optimization of a load reduction event, given user input provided at the user interface 800. Other optimization parameters may be utilized on the user interface 800.

The user interface 800 includes fields for receiving user input related to tailoring optimization of the load reduction event. The user input may be used to modify load objective components that are defined by functions of the load reduction curve. The modified load objective components can be used in optimizing the load reduction event per the received user input.

The user interface 800 can receive user input via load dispatch fields. The load dispatch fields may include a duration field 810, an energy reduction field 820, and a limits on control variables field 830. The duration field 810 can be used to receive user input indicating a duration of a load reduction event. The duration field 810 of the load reduction event can be adjusted by seconds, minutes, hours, and the like. Referring to FIG. 8, a user may input a load reduction event with duration of 120 minutes via the duration field 810. The energy reduction field 820 can be used to specify a percentage of energy reduction that the load reduction event is optimized against. A user may also input an energy reduction of 10% via the energy reduction field 820. The limits on control variables field 830 can be used to indicate user-specified control variables for optimizing the load reduction event. The control variables can include maximum temperature offsets, minimum temperature offsets, and the like. Further, a user may input a maximum temperature offset of 8 degrees Fahrenheit via the limits on control variables field 830.

The user interface 800 can also receive user input via load reduction curve specification inputs. The load reduction curve specification inputs may include a total reduction weighting field 840, a curve shape weighting field 850, and a noise around curve weighting field 860. The total reduction weighting field 840 can be used to receive user input indicating a percentage at which the load reduction event should be optimized with respect to total energy reduction. Referring to FIG. 8, a user may input a total reduction weighting of 80% via the total reduction weighting field 840. The curve shape weighting field 850 can be used to receive user input indicating a percentage at which the load reduction event should be optimized against a provided load reduction curve. Additionally, a user may input a curve shape weighting of 12% via the curve shape weighting field 850. The noise around curve weighting field 860 can be used to indicate a percentage weighting at which a noise threshold should be applied around the load reduction curve. Further, a user may input a noise around curve weighting of 8% via the noise around curve weighting field 860. The various load reduction curve specification inputs can include various percentages that are summed to 100%. In this instance, the weighting of the load reduction curve may be distributed across the load reduction curve specification inputs.

The user interface 800 can also receive load reduction curve specification inputs from the optimization engine 274. In particular, the optimization engine 274 can be configured to choose weights by constructing a set of three canonical reduction curves that exhibit similar loss—a flat curve, a linearly increasing curve, and a flat curve with noise, and provide the weights to the user interface 800. In some implementations, the optimization engine 274 may determine three canonical reductive curves using the following equations:

$$R^0_{flat}(t) = \alpha_0 - \Delta\alpha_0 \tag{L1}$$

$$R^0_{linear}(t) = \alpha_0 - \beta_0\left(t - \left(\frac{N_0 - 1}{2}\right)\right) \tag{L2}$$

$$R^0_{noise}(t) = \alpha_0 - \sigma_0 v(t) \tag{L3}$$

The optimization engine 274 may determine each of these equations each with various parameters. For instance, the optimization engine 274 constructs the flat curve with noise with a noise function v(t), which is defined to have a mean of zero and a root mean square fluctuation equal to 1. In one example, when $N_0$ is an odd number, the noise function v(t) can be defined as follows:

$$v(t) = (-1)^{\left|t - \frac{N_0-1}{2}\right|} \tag{M}$$

The above noise function v(t) alternates between positive and negative unit fluctuations as to be symmetric between first and second half of an event, to ensure an average zero drift. The root mean square fluctuation only approximates to 1 when $N_0$ is an even number.

The optimization engine 274 may set $N_0=12$ and $\alpha_0=1$ to define a common load and time scale for each of the canonical reduction curves. Next, the optimization engine 274 determines the remained of the parameters under the following constraints:

$$\Delta\alpha_0 < \beta_0 * \frac{(N_0 - 1)}{2} \tag{N1}$$

$$\Delta\alpha_0 < \sigma_0 \tag{N2}$$

These two constraints as reflected above in N and O characterize meaningful tradeoffs between each of the canonical reduction curves. In particular, the two constraints ensure the flat curve does is not strictly below either the sloped or noisy curve. Using the following constraints, the optimization engine 274 determines the following values:

$$\Delta\alpha_0 = 0.25 \tag{O1}$$

$$\beta_0 = \frac{1}{N_0 - 1} \tag{O2}$$

$$\sigma_0 = 0.5 \tag{O3}$$

By choosing the values for $\beta_0$ and $\sigma_0$, the optimization engine 274 ensures it to be equivalent that A) the canonical reductive curves linearly increase from 0.5 below to 0.5 above the mean value, or B) the canonical reduction curve consists of points alternating between 0.5 above and 0.5 below that value.

The aforementioned parameters calculated by the optimization engine 274 are shown for exemplary purposes. Other desired parameters may be calculated by the optimization engine 274. Continuing with this example, plugging each of these parameters into the reduction curve equations provides the following:

$$R^0_{flat}(t) = \alpha_0 - \Delta\alpha_0 = 1 - 0.25 = 0.75 \tag{P1}$$

$$R^0_{linear}(t) = \alpha_0 - \beta_0\left(t - \left(\frac{N_0 - 1}{2}\right)\right) = 1 + \frac{t}{11} \tag{P2}$$

$$R^0_{noise}(t) = \alpha_0 - \sigma_0 v(t) = 1 + 0.5v(t) \tag{P3}$$

In order for the optimization engine 274 to determine the weighted values to provide to the user interface 800, the optimization engine 274 can enforce the equalities for each of the losses of each canonical reduction curves to be similar. For example, $L(R_{flat}^0)=L(R_{linear}^0)=L(R_{noise}^0)$, enforces the loss similarity to allow the optimization engine 274 to choose weights $w_1$, $w_2$, and $w_3$.

The first equality $L(R_{flat}^0)=L(R_{linear}^0)$ implies that $\Delta\alpha_0 = w_1\beta_0(N_0-1)$, such that:

$$w_1 = \frac{\Delta\alpha_0}{\beta_0(N_0 - 1)} = 0.25 \tag{Q}$$

The second equality $L(R_{flat}^0)=L(R_{noise}^0)$ implies that $\Delta\alpha_0 = w_2\sigma_0$, such that:

$$w_2 = \frac{\Delta\alpha_0}{\sigma_0} = 0.5 \tag{R}$$

Consequently, the third equality $L(R_{linear}^0)=L(R_{flat}^0)$ implies that $w_1\beta_0(N_0-1)=w_3w_2\sigma_0$, such that:

$$w_3 = \frac{\beta_0(N_0 - 1) * w_1}{\sigma_0 * w_2} = 1 \tag{S}$$

Therefore, the optimization engine 274 can input each of the determined weights $w_1$, $w_2$, and $w_3$ from the aforementioned equations into the user interface 800. For example, the optimization engine 274 can set the total reduction weighting field 840 to 25%, the curve shape weighting field 850 to 50%, and the noise around curve weighting field 860 to 100%, as determined by the weights $w_1$, $w_2$, and $w_3$. Alternatively, the optimization engine 274 may set other parameters for the total reduction weighting field 840, the curve shape weighting field 850, and the noise around curve weighting field 860.

The user interface 800 can also receive user input via load reduction curve modification inputs. The load reduction curve modification inputs can include a load/cost curve field 870 and a cost curve conversion field 880. The load/cost curve field 870 can be used to receive user input indicating a particular shape of a load curve or a cost curve. Referring to FIG. 8, a user may input a load curve shape with a that slowly increases over a first period of time, drops off and maintains a relatively flat shape over a second period of time, (e.g., a period of peak energy consumption), and rises quickly before slowly decreases over a third period of time. The cost curve conversion field 880 can be used to convert the load curve to a cost curve and vice-versa. In this instance, the cost curve conversion field 880 may include a button on the user interface 800 that converts the load curve to a cost curve upon activation, (e.g., receiving user input at the button), and vice-versa.

The user interface 800 can further receive user input via time-weighted objective inputs. The time-weighted objective inputs can include time weighting fields 890 that correspond to time reduction curve values of a load reduction event as the reduction curve values are consumed by loss functions. For example, the user interface 800 can include multiple fields that are adjusted manually or automatically, with reference to the duration field 810. In this instance, the duration of the load reduction event is 120 minutes and the time weighting fields 890 are distributed across three periods of time: 0 minutes to 30 minutes, 30 minutes to 100 minutes, and 100 minutes to 120 minutes. Each of the three periods of time may be weighted based on a particular percentage. Referring to FIG. 8, the first period of time from 0 minutes to 30 minutes includes a time weighting of 15%, the second period of time from 30 minutes to 100 minutes includes a time weighting of 75%, and the third period of time from 100 minutes to 120 minutes includes a time weighting of 10%. As such, the duration of the load reduction event may be broken into various sub-durations in which the load objective over each sub-duration is individually weighted.

The optimization parameters of the user interface 800 can be defined by functions of a particular load reduction curve. In some aspects, the optimization parameters specify the load objective components. Additionally, the load object components may be defined by functions of a particular load reduction curve. For example, one type of load objective component, such as a loss objective component, may be modeled as a function of the reduction R and specified by an optimization parameter c. This can be visualized by the following equation:

$$(T)f(R)=c*\max(R)$$

Other load object components may be specified by other optimization parameters. Equation T is shown merely for illustrative and example purposes.

In some instances, the load reduction event may be optimized based on load reduction weightings associated with the various optimization parameters, and referenced to underlying functions. The weightings can apply to values that are derived from linear regression and/or are directed towards various aspects of the load reduction curve. The time weighting fields 890 may be incorporated in the linear regression through weighted least squares. For example, a first weighted value 840 may be derived from linear regression and directed to optimizing a total amount of load reduction achieved in the load reduction event. In another example, a second weighted value 850 may be derived from linear regression and directed towards capturing shed drift relative to the load reduction curve. In another example, a third weighted value 860 may be directed to minimizing the amount of noise around a linear estimate of the load reduction curve achieved in the load reduction event. The load reduction event may be optimized, in part, based on the weightings that are directed towards the various optimization parameters.

Figure 9:
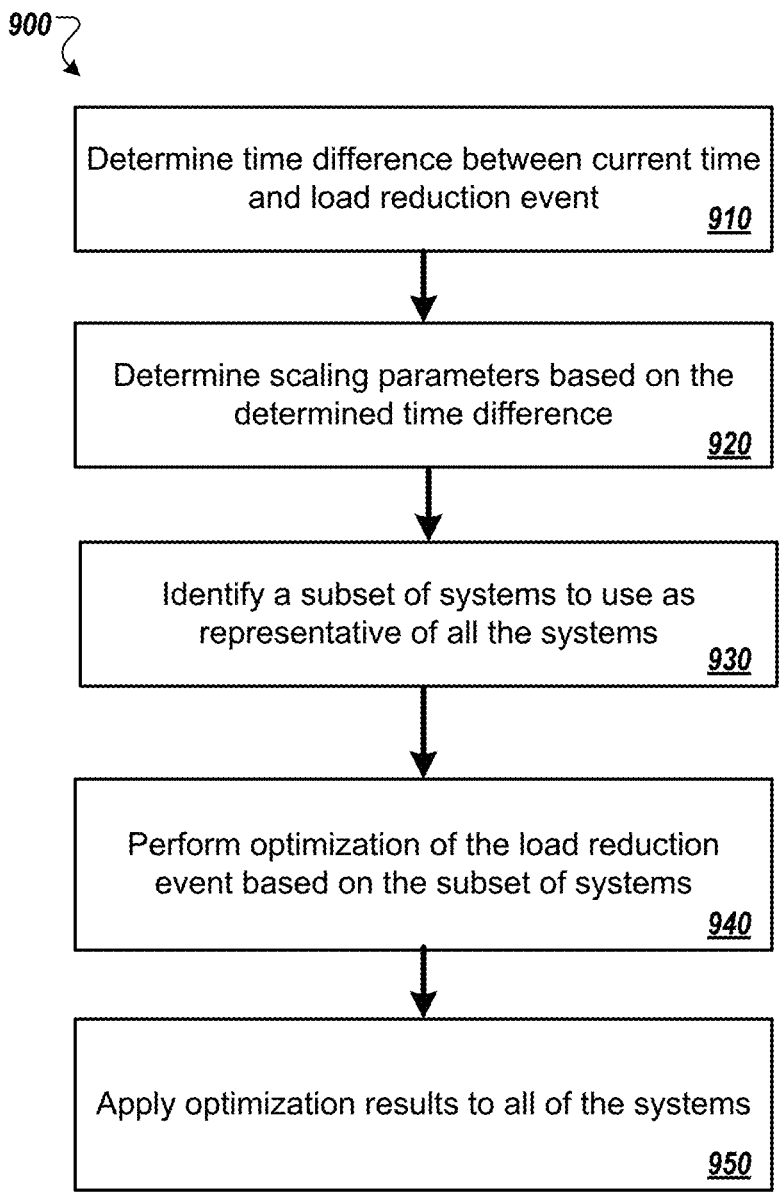
FIG. 9 is a flow chart illustrating an example process for determining and applying scaling factors to monitoring systems.

FIG. 9 is a flow chart illustrating an example process 900 for determining and applying scaling factors to monitoring systems. For convenience, the process 900 will be described as being performed by a system of one or more computers located in one or more locations. For example, an optimization server, e.g., the optimization server 130 of FIG. 1, can perform the process 900.

At step 910, the optimization server determines a time difference between a current time and a time of a load reduction event.

At step 920, the optimization server determines scaling parameters based on the determined time difference and a number of monitored systems, such as monitored systems 210A-N.

At step 930, the optimization server identifies a subset of systems to use as representative of all the systems. The optimization server can be configured to identify the particular subset of systems based on the one or more scaling parameters.

At step 940, the optimization server performs optimization of the load reduction event based on the particular subset of systems. The optimization of the load reduction event can include modified control parameters of the particular subset of systems.

At step 950, the optimization server applies optimization results to all of the systems. The optimization server can be configured to apply the optimization results to all of the systems based on the modified control parameters of the particular subset of systems. In some cases, sites are assigned control parameters based on their characteristics and the event parameters.

Figure 10:
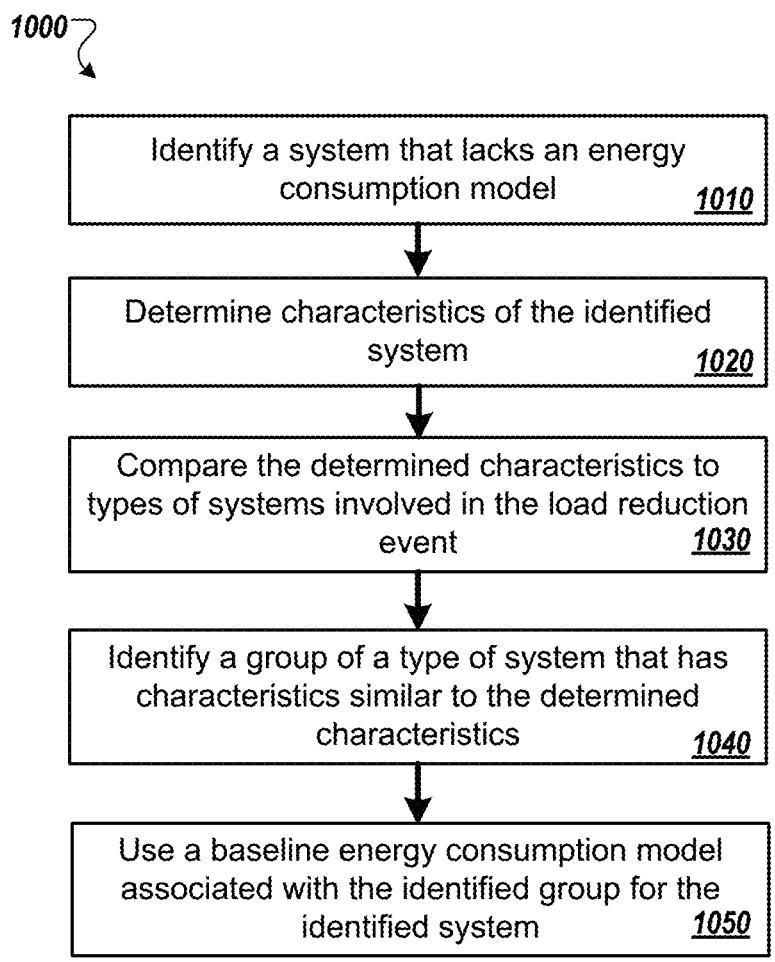
FIG. 10 is a flow chart illustrating an example process for identifying and using a baseline energy consumption model.

FIG. 10 is a flow chart illustrating an example process 1000 for identifying and using a baseline energy consumption model. For convenience, the process 1000 will be described as being performed by a system of one or more computers located in one or more locations. For example, an optimization server, e.g., the optimization server 130 of FIG. 1, can perform the process 1000.

At step 1010, the optimization server identifies a system that lacks an energy consumption model.

At step 1020, the optimization server determines characteristics of the identified system.

At step 1030, the optimization server compares the determined characteristics to types of systems involved in the load reduction event.

At step 1040, the optimization server identifies a group of systems that has characteristics similar to the determined characteristics. The optimization server can be configured to identify the group of systems with similar characters based on results of the comparison.

At step 1050, the optimization server uses a baseline energy consumption model associated with the identified group for the identified system.

Figure 11:
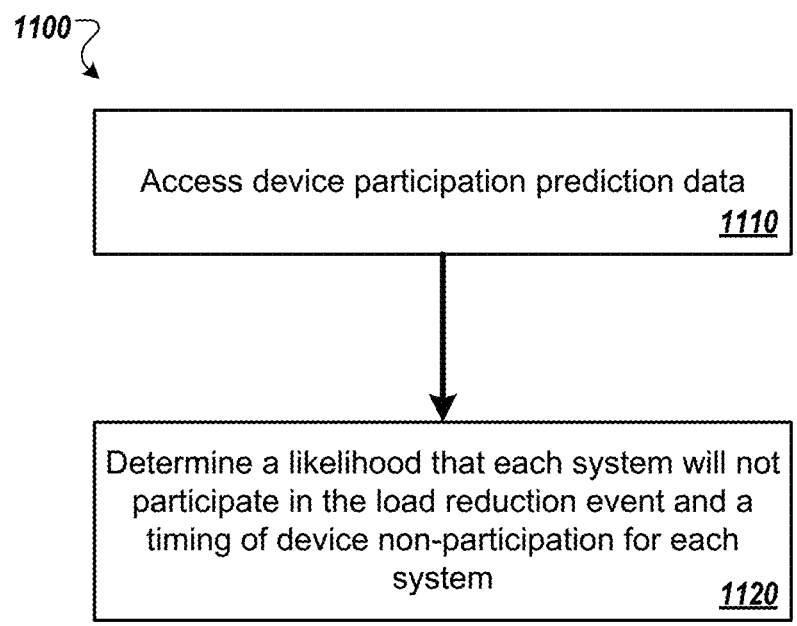
FIG. 11 is a flow chart illustrating an example process for optimizing a load reduction event based on determined device participation data.

FIG. 11 is a flow chart illustrating an example process 1100 for optimizing a load reduction event based on determined device participation data. For convenience, the process 1100 will be described as being performed by a system of one or more computers located in one or more locations. For example, an optimization server, e.g., the optimization server 130 of FIG. 1, can perform the process 1100.

At step 1110, the optimization server accesses device participation prediction data corresponding to each of the multiple systems.

At step 1120, the optimization server determines a likelihood that each system will not participate in the load reduction event and a timing of device non-participation for each system. The optimization server can be configured to determine a likelihood of non-participation for each system and/or the timing of device non-participation for each system based on the device participation prediction data.

FIG. 12 is an exemplary diagram of a data structure 1200 for device participation prediction. The data structure 1200 describes device participation predictive information corresponding to a population of systems that are enrolled in a particular load reduction event. The data structure 1200 includes sites 1210, a likelihood 1220 that each site will not participate in the particular load reduction event, and a timing 1230 at which each site is likely to not participate in the particular load reduction event.

The sites 1210 include multiple sites associated with monitoring systems. The monitoring systems of the sites are adjusted using optimal control parameters that are determined by an optimization server. The optimization server can be configured to define an optimal load reduction event that is dispatched to the monitoring systems of the sites 1210, based on the enrollment of the sites 1210 in the particular load reduction event. The sites 1210 can include any number of sites or subsets of sites. The sites may include one or more monitoring systems that may each include individual device participation prediction data. Referring to FIG. 12, the sites 1210 in the data structure 1200 includes site 1, site 2, site N, and so on.

The likelihood 1220 data includes device participation probabilities for each of the sites 1210. The probabilities reference a determined likelihood that each site is not likely to participate in the particular load reduction event. The likelihood 1220 data may be generated and used by the optimization server to anticipate non-participants, and to adjust the optimal load reduction event accordingly. For example, the optimization server may receive multiple non-participants for a load reduction event, and dynamically adjust the control parameters for a monitoring systems associated with a population of enrolled sites to account for the non-participants. Referring to FIG. 12, site 1 is 5% likely to not participate in the particular load reduction event, site 2 is 10% likely to not participate in the particular load reduction event, and site N is 30% likely to not participate in the particular load reduction event. In some cases, site non-participant probability is estimated as a function of time, throughout the course of the event. In some aspects, the optimization server may use likelihood 1220 data to optimize the particular load reduction event. For example, given that site N is 30% not likely to participate in the particular load reduction event, the optimization server may initially determine to not adjust control parameters of the monitoring systems of site N based on the determined 30% likelihood that site N is not participating in the load reduction event.

The timing 1230 data includes an estimated timing of device non-participation for each of the sites 1310. The estimated non-participant timings correspond to an estimated time at which a particular site is likely to stop participating in the load reduction event. The timing data 1230 may be generated and used by the optimization server to anticipate non-participants, and adjust the optimal load reduction event accordingly. The optimization server may receive multiple non-participants for a load reduction event, and dynamically adjust the control parameters for a monitoring systems associated with a population of enrolled sites to account for the non-participants. For example, the particular load reduction event can include thermostat adjustment of monitoring systems at the sites 1210. The non-participant timings reference times relative to periods of times in which thermostats are adjusted at the various sites. Referring to FIG. 12, site 1 is not likely to participate in the particular load reduction event at 10 minutes before the end of thermostat adjustment, site 2 is not likely to participate in the particular load reduction event at 15 minutes after the beginning of thermostat adjustment, and site N is not likely to participate in the particular load reduction event at 30 minutes before the beginning of thermostat adjustment. In some aspects, the optimization server may use to timing 1230 information in optimizing the particular load reduction event. For example, given that site N is 30% not likely to participate in the particular load reduction event before the beginning of thermostat adjustment, the optimization server may initially determine to not adjust control parameters of the monitoring systems of site N based on the determined likelihood and timing information for site N.

Figure 13:
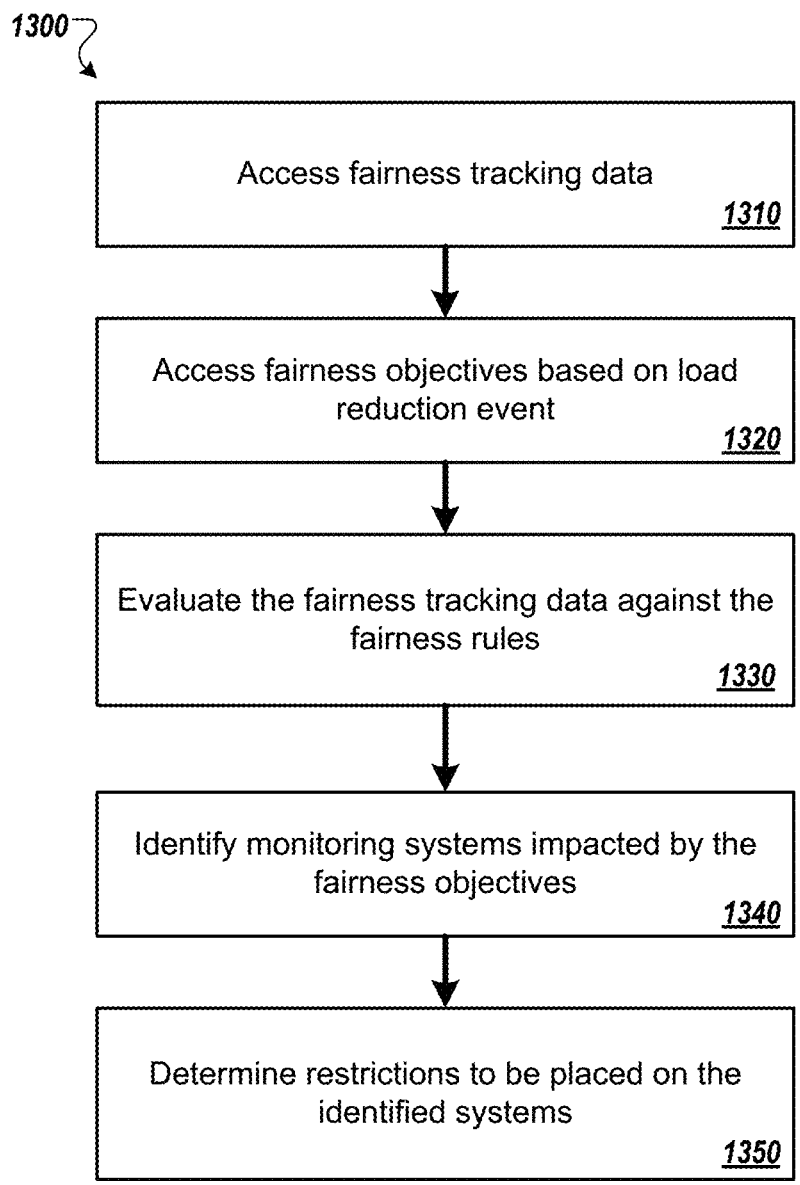
FIG. 13 is a flow chart illustrating an example process for optimizing a load reduction event according to determined restrictions.

FIG. 13 is a flow chart illustrating an example process 1300 for optimizing a load reduction event according to determined restrictions. For convenience, the process 1300 will be described as being performed by a system of one or more computers located in one or more locations. For example, an optimization server, e.g., the optimization server 130 of FIG. 1, can perform the process 1300.

At step 1310, the optimization server accesses fairness tracking data corresponding to the multiple systems.

At step 1320, the optimization server accesses one or more fairness objectives corresponding to the load reduction event.

At step 1330, the optimization server evaluates the fairness tracking data against the one or more fairness objectives.

At step 1340, the optimization server identifies a subset of monitoring system that are impacted by the one or more fairness objectives based on the evaluation.

At step 1350, the optimization server determines one or more restrictions to be placed on the subset of impacted monitoring systems. In some aspects, the one or more restrictions represent limits to modifications of the control parameters of the subset of impacted monitoring systems. In some cases, the one or more fairness objectives are incorporated into the Optimization Parameters 275, influencing how control parameters are modified and optimized.

Figure 14:
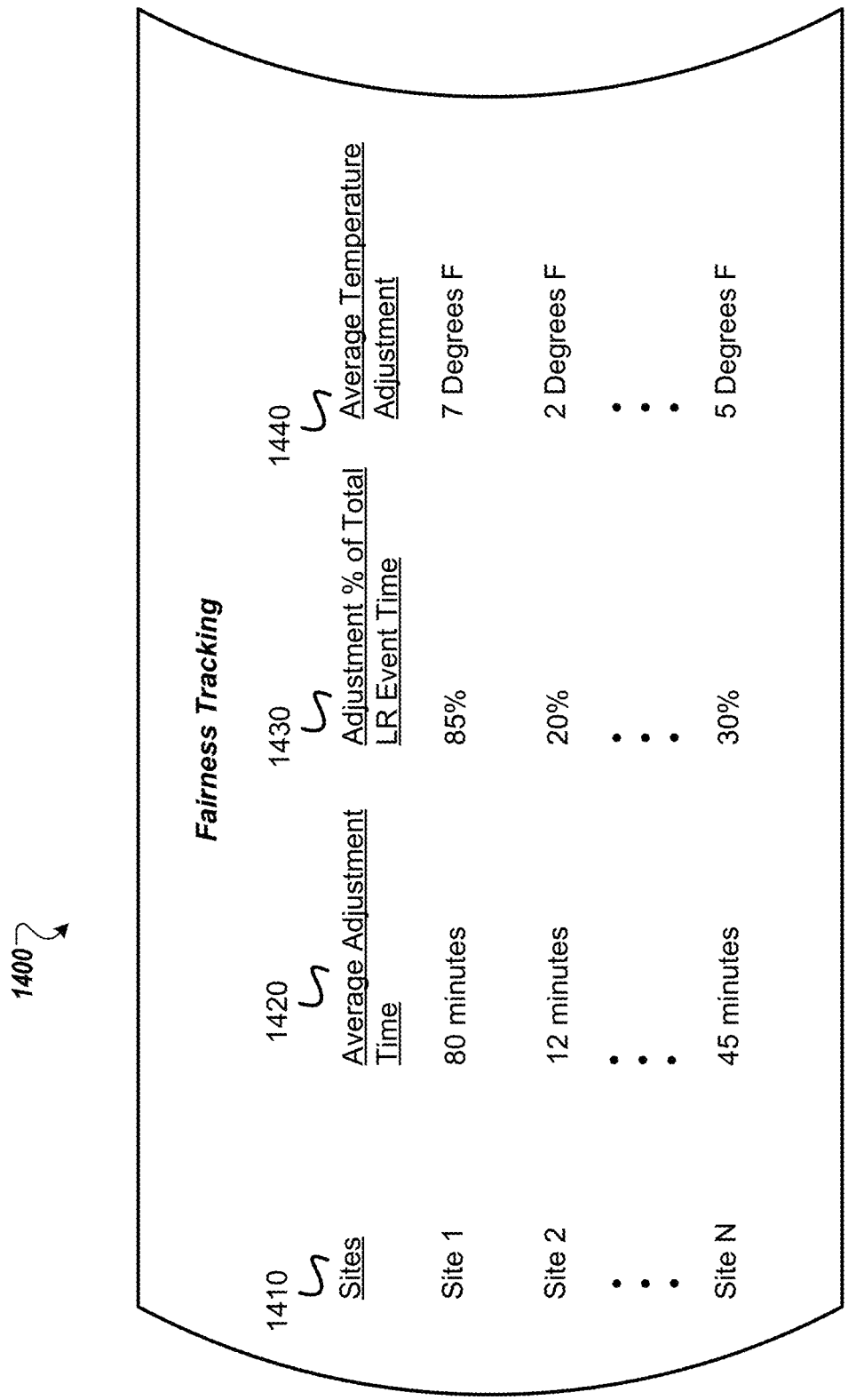
FIG. 14 is an exemplary diagram of a data structure for fairness tracking.

FIG. 14 is an exemplary diagram of a data structure 1400 for fairness tracking. The data structure 1400 describes fairness tracking information corresponding to a population of systems that are enrolled in an energy consumption program, (e.g., load reduction events). The data structure 1400 includes sites 1410, an average adjustment time 1420 that monitoring systems of the sites are adjusted during load reduction events, adjustment percentages 1430 of total load reduction event times for each of the sites, and average temperature adjustments 1440 for each of the sites.

The sites 1410 include multiple sites associated with monitoring systems. The monitoring systems of the sites are adjusted using optimal control parameters that are determined by an optimization server. The optimization server can be configured to define an optimal load reduction event that is dispatched to the monitoring systems of the sites 1410, based on the enrollment of the sites 1410 in the particular load reduction event. The sites 1410 can include any number of sites or subsets of sites. The sites may include one or more monitoring systems that may each include fairness tracking data. Referring to FIG. 14, the sites 1410 in the data structure 1400 includes site 1, site 2, site N, and so on.

The average adjustment times 1420 include various duration adjustments across monitoring systems associated with the sites 1410. The average adjustment times 1420 can indicate an average period of time during load reduction events in which a monitoring system associated with a particular site is adjusted. For example, a monitoring system may correspond to a thermostat and the thermostat at the particular site may be adjusted for an average period of seconds, minutes, hours, and the like, over the duration of multiple load reduction events. Referring to FIG. 14, site 1 is adjusted for an average of 80 minutes over the duration of load reduction events, site 2 is adjusted for an average of 12 minutes over the duration of load reduction events, site N is adjusted for an average of 45 minutes over the duration of load reduction events, and so on. The average adjustment times 1420 may be calculated to indicate how often a particular site is impacted during load reduction events in comparison to other enrolled sites.

The average adjustment percentage of total load reduction event times 1430 include various duration adjustments across monitoring systems associated with the sites 1410. The average adjustment percentages 1430 can indicate an average percentage of time over the duration of multiple load reduction events at which a monitoring system associated with a particular site is adjusted. For example, a monitoring system may correspond to a thermostat and the thermostat at the particular site may be adjusted for an average percentage of time that indicates a portion of time over the duration of load reduction events at which the thermostat was adjusted. Referring to FIG. 14, site 1 is adjusted for an average of 85% of the duration of load reduction events, site 2 is adjusted for an average of 20% of the duration of load reduction events, site N is adjusted for an average of 30% of the duration of load reduction events, and so on. The average percentages of total load reduction event time 1430 may be calculated to indicate spans of time at which a particular site is impacted during load reduction events in comparison to other enrolled sites.

The average temperature adjustments 1440 include various degrees in magnitude of temperature adjustments across monitoring systems associated with the sites 1410. The average temperature adjustments 1440 can indicate an average temperature in degrees Fahrenheit and/or Celsius at which a monitoring system associated with a particular site is adjusted over the duration of multiple load reduction events. For example, a monitoring system may correspond to a thermostat and the thermostat at the particular site may be adjusted at an average temperature adjustment over the course of multiple load reduction events. Referring to FIG. 14, site 1 is adjusted an average of 7 degrees Fahrenheit, site 2 is adjusted an average of 2 degrees Fahrenheit, site 1 is adjusted an average of 5 degrees Fahrenheit, and so on. The average temperature adjustments 1440 may be determined to indicate an of average temperature adjustments that a particular site is impacted during load reduction events in comparison to other enrolled sites.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A computer-implemented method comprising:
    maintaining data a) for executing a load reduction event b) that comprises (i) a first set of load reduction parameters associated with the load reduction event, (ii) energy consumptions models from multiple systems participating in the load reduction event, and (iii) a load reduction curve for the load reduction event;
    maintaining, for each system of the multiple systems, data that comprises (i) an indicator of a system, (ii) a likelihood that each system is not likely to participate in the load reduction event, and (iii) an estimated time at which each system of the multiple system is likely to stop participating in the load reduction event;
    maintaining timing data comprising (i) a current time of the load reduction event and (ii) a start time of the load reduction event;
    comparing, for each system of the multiple systems, the maintained timing data to the estimated time at which the system is likely to stop participating in the load reduction event;
    identifying a subset of the multiple systems using a result of the comparison;
    optimizing, against the load reduction curve, the load reduction event by performing simulations with the energy consumption models of the identified subset of systems to generate an optimal load reduction event that comprises a second set of load reduction parameters; and
    providing the second set of load reduction parameters to one or more systems of the multiple systems to execute the optimal load reduction event.

2. The computer-implemented method of claim 1, wherein each system comprises one or more of an HVAC system or a thermostat configured to control the HVAC system.

3. The computer-implemented method of claim 1, wherein optimizing, against the load reduction curve, the load reduction event by performing the simulations with the energy consumption models further comprises:
    optimizing, against the load reduction curve, the load reduction event by iteratively modifying the first set of load reduction parameters used in a plurality of simulations of load reduction events, wherein the plurality of simulations of load reduction events simulate variations in control parameters used to control the multiple systems; and
    outputting the optimal load reduction event with the second set of load reduction parameters.

4. The computer-implemented method of claim 3, wherein optimizing the load reduction event by iteratively modifying the control parameters comprises:
    assigning a weighted value to load objective components that are defined by functions of the load reduction curve; and
    optimizing the load reduction event using the weighted values of each of the load objective components.

5. The computer-implemented method of claim 4, wherein assigning a weighted value to the load objective components that are defined by functions of the load reduction curve comprises:
    assigning a first weighted value to a first load objective component derived from linear regression and directed to optimizing a total amount of load reduction achieved in the load reduction event;
    assigning a second weighted value to a second load objective component derived from linear regression and directed to capturing shed drift relative to the load reduction curve; and assigning a third weighted value to a third load objective component directed to optimizing an amount of noise around a linear estimate of the load reduction curve achieved in the load reduction event, wherein optimizing the load reduction event uses the weighted values of each of the load objective components, the first load objective component weighted according to the first weighted value, the second load objective component weighted according to the second weighted value, and the third load objective component weighted according to the third weighted value.

6. The computer-implemented method of claim 1, wherein comparing the maintained timing data to the estimated time at which the system is likely to stop participating in the load reduction event further comprises:

comparing the likelihood that the system is not likely to participate in the load reduction event to a threshold value; and comparing the (i) current time and (ii) the start time of the load reduction event to the estimated time at which the system is likely to stop participating in the load reduction event.

7. The computer-implemented method of claim 6, wherein identifying the subset of the multiple systems based on the comparison that exceed the threshold further comprises:

in response to (i) determining the likelihood does satisfy the threshold value and (ii) the maintained timing data does satisfy the estimated time at which the system is likely to stop participating in the load reduction event, identifying the system to be included in the subset of the multiple systems.

8. The computer-implemented method of claim 6, wherein identifying the subset of the multiple systems based on the comparison that exceed the threshold further comprises:

in response to (i) determining the likelihood does not satisfy the threshold value or (ii) the maintained timing data does not satisfy the estimated time at which the system is likely to stop participating in the load reduction event, preventing the system to be included in the subset of the multiple systems.

9. The computer-implemented method of claim 1, wherein the energy consumption models represent thermal models of sites where the multiple systems are located, the thermal models including cooling properties of HVAC units located at the properties.

10. The computer-implemented method of claim 1, wherein optimizing, against the load reduction curve, the load reduction event by performing simulations with the energy consumption models of the identified subset of systems further comprises:

identifying, from among the simulations, the simulation that most closely matches the load reduction curve comprises determining optimized control parameters that result in the simulation that most closely matches the load reduction curve.

11. A system comprising:

one or more computers and one or more storage devices storing instructions that are operable, when executed by the one or more computers, to cause the one or more computers to perform operations comprising:

maintaining data a) for executing a load reduction event b) that comprises (i) a first set of load reduction parameters associated with the load reduction event, (ii) energy consumptions models from multiple systems participating in the load reduction event, and (iii) a load reduction curve for the load reduction event;

maintaining, for each system of the multiple systems, data that comprises (i) an indicator of a system, (ii) a likelihood that each system is not likely to participate in the load reduction event, and (iii) an estimated time at which each system of the multiple system is likely to stop participating in the load reduction event;

maintaining timing data comprising (i) a current time of the load reduction event and (ii) a start time of the load reduction event;

comparing, for each system of the multiple systems, the maintained timing data to the estimated time at which the system is likely to stop participating in the load reduction event;

identifying a subset of the multiple systems using a result of the comparison;

optimizing, against the load reduction curve, the load reduction event by performing simulations with the energy consumption models of the identified subset of systems to generate an optimal load reduction event that comprises a second set of load reduction parameters; and providing the second set of load reduction parameters to one or more systems of the multiple systems to execute the optimal load reduction event.

12. The system of claim 11, wherein each system comprises one or more of an HVAC system or a thermostat configured to control the HVAC system.

13. The system of claim 11, wherein optimizing, against the load reduction curve, the load reduction event by performing the simulations with the energy consumption models further comprises:

optimizing, against the load reduction curve, the load reduction event by iteratively modifying the first set of load reduction parameters used in a plurality of simulations of load reduction events, wherein the plurality of simulations of load reduction events simulate variations in control parameters used to control the multiple systems; and outputting the optimal load reduction event with the second set of load reduction parameters.

14. The system of claim 13, wherein optimizing the load reduction event by iteratively modifying the control parameters comprises:

assigning a weighted value to load objective components that are defined by functions of the load reduction curve; and optimizing the load reduction event using the weighted values of each of the load objective components.

15. The system of claim 14, wherein assigning a weighted value to the load objective components that are defined by functions of the load reduction curve comprises:

assigning a first weighted value to a first load objective component derived from linear regression and directed to optimizing a total amount of load reduction achieved in the load reduction event;

assigning a second weighted value to a second load objective component derived from linear regression and directed to capturing shed drift relative to the load reduction curve; and assigning a third weighted value to a third load objective component directed to optimizing an amount of noise around a linear estimate of the load reduction curve achieved in the load reduction event, wherein optimizing the load reduction event uses the weighted values of each of the load objective components, the first load objective component weighted according to the first weighted value, the second load objective component weighted according to the second weighted value, and the third load objective component weighted according to the third weighted value.

16. The system of claim 11, wherein comparing the maintained timing data to the estimated time at which the system is likely to stop participating in the load reduction event further comprises:
comparing the likelihood that the system is not likely to participate in the load reduction event to a threshold value; and
comparing the (i) current time and (ii) the start time of the load reduction event to the estimated time at which the system is likely to stop participating in the load reduction event.

17. The system of claim 16, wherein identifying the subset of the multiple systems based on the comparison that exceed the threshold further comprises:
in response to (i) determining the likelihood does satisfy the threshold value and (ii) the maintained timing data does satisfy the estimated time at which the system is likely to stop participating in the load reduction event, identifying the system to be included in the subset of the multiple systems.

18. The system of claim 16, wherein identifying the subset of the multiple systems based on the comparison that exceed the threshold further comprises:
in response to (i) determining the likelihood does not satisfy the threshold value or (ii) the maintained timing data does not satisfy the estimated time at which the system is likely to stop participating in the load reduction event, preventing the system to be included in the subset of the multiple systems.

19. The system of claim 11, wherein the energy consumption models represent thermal models of sites where the multiple systems are located, the thermal models including cooling properties of HVAC units located at the properties.

20. A non-transitory computer-readable medium storing software comprising instructions executable by one or more computers which, upon such execution, cause the one or more computers to perform operations comprising:
maintaining data a) for executing a load reduction event b) that comprises (i) a first set of load reduction parameters associated with the load reduction event, (ii) energy consumptions models from multiple systems participating in the load reduction event, and (iii) a load reduction curve for the load reduction event;
maintaining, for each system of the multiple systems, data that comprises (i) an indicator of a system, (ii) a likelihood that each system is not likely to participate in the load reduction event, and (iii) an estimated time at which each system of the multiple system is likely to stop participating in the load reduction event;
maintaining timing data comprising (i) a current time of the load reduction event and (ii) a start time of the load reduction event;
comparing, for each system of the multiple systems, the maintained timing data to the estimated time at which the system is likely to stop participating in the load reduction event;
identifying a subset of the multiple systems using a result of the comparison;
optimizing, against the load reduction curve, the load reduction event by performing simulations with the energy consumption models of the identified subset of systems to generate an optimal load reduction event that comprises a second set of load reduction parameters; and
providing the second set of load reduction parameters to one or more systems of the multiple systems to execute the optimal load reduction event.

* * * * *